US009886789B2

(12) United States Patent
Takami

(10) Patent No.: US 9,886,789 B2
(45) Date of Patent: Feb. 6, 2018

(54) DEVICE, SYSTEM, AND PROCESS FOR SEARCHING IMAGE DATA BASED ON A THREE-DIMENSIONAL ARRANGEMENT

(75) Inventor: Shinya Takami, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 169 days.

(21) Appl. No.: 14/119,233

(22) PCT Filed: May 31, 2011

(86) PCT No.: PCT/JP2011/062476
§ 371 (c)(1),
(2), (4) Date: Nov. 21, 2013

(87) PCT Pub. No.: WO2012/164685
PCT Pub. Date: Dec. 6, 2012

(65) Prior Publication Data
US 2014/0118343 A1    May 1, 2014

(51) Int. Cl.
*G06T 15/00* (2011.01)
*G06F 17/30* (2006.01)
(Continued)

(52) U.S. Cl.
CPC .......... *G06T 15/00* (2013.01); *G06F 3/04815* (2013.01); *G06F 17/30259* (2013.01);
(Continued)

(58) Field of Classification Search
CPC .......... A63F 13/63; G06F 17/30244–17/3028; G06F 17/30259; G06F 17/30268; G06F 17/30277
See application file for complete search history.

(56) References Cited

U.S. PATENT DOCUMENTS 5,999,879 A * 12/1999 Yano .................... G08G 1/0969
340/988
6,084,589 A    7/2000 Shima
(Continued)

FOREIGN PATENT DOCUMENTS

CN    1181557 A    5/1998
CN    1720527 A    1/2006
(Continued)

OTHER PUBLICATIONS

Kadobayashi, Rieko, and Katsumi Tanaka. "3D viewpoint-based photo search and information browsing." Proceedings of the 28th annual international ACM SIGIR conference on Research and development in information retrieval. ACM, 2005.*
(Continued)

*Primary Examiner* — Daniel Hajnik
(74) *Attorney, Agent, or Firm* — Sughrue Mion, PLLC

(57) ABSTRACT

An information providing device can efficiently search for image data which includes an image of an object matching a user's preference, or can efficiently recommend information related to an image-capturing spot matching the user's preference. The information providing device receives three-dimensional arrangement information which indicates an arrangement of an object in three-dimensional space, and line-of-sight information for specifying a point-of-view position and a line-of-sight direction in the three-dimensional space, from a terminal device, generates two-dimensional arrangement information which indicates, in a two-dimensional plane, an arrangement of the object projected on the two-dimensional plane based on the received three-dimensional arrangement information and line-of-sight information, and compares arrangement information stored in a memory means that stores image data and the arrangement information which indicates, in an image, an arrangement of the object included in the image indicated by the
(Continued)

image data, and the generated two-dimensional arrangement information, and searches for the image data based on a result of the comparison.

16 Claims, 9 Drawing Sheets

(51) Int. Cl.
G06T 15/20 (2011.01)
G06F 3/0481 (2013.01)
(52) U.S. Cl.
CPC .. *G06F 17/30268* (2013.01); *G06F 17/30277* (2013.01); *G06T 15/20* (2013.01)

(56) References Cited

U.S. PATENT DOCUMENTS

| | | | | | |
|---|---|---|---|---|---|
| 2003/0107647 | A1* | 6/2003 | James | ................ | A63F 13/10 348/116 |
| 2005/0046645 | A1* | 3/2005 | Breton | ................ | G06T 15/20 345/660 |
| 2007/0110338 | A1* | 5/2007 | Snavely | ............ | G06F 17/30274 382/305 |
| 2008/0180439 | A1* | 7/2008 | Adabala | ................ | G06T 11/206 345/421 |
| 2009/0271422 | A1* | 10/2009 | Finn | ........................ | G06T 19/20 |
| 2009/0281925 | A1* | 11/2009 | Winter | ................ | G06F 17/3025 705/26.1 |
| 2010/0007636 | A1* | 1/2010 | Tomisawa | .............. | G03B 37/04 345/204 |
| 2010/0250588 | A1 | 9/2010 | Kita | | |
| 2011/0196864 | A1* | 8/2011 | Mason | ................. | G06F 3/0416 707/728 |

FOREIGN PATENT DOCUMENTS

| | | |
|---|---|---|
| CN | 101853268 A | 10/2010 |
| JP | 08-335223 A | 12/1996 |
| JP | 2002-373168 A | 12/2002 |
| JP | 2006309722 A | 11/2006 |
| JP | 2010-237804 A | 10/2010 |

OTHER PUBLICATIONS

Snavely, Noah, Steven M. Seitz, and Richard Szeliski. "Modeling the world from internet photo collections." International Journal of Computer Vision 80.2 (2008): 189-210.*

Michael Lively Video titled: "Sketchup and Google 3D Warehouse Tutorial" with select screenshots included, published Mar. 2008, available at: https://www.youtube.com/watch?v=GTDoLfECkgU.*

Video "Microsoft Photosynth" dated Jul. 27, 2006, publicly available for viewing at https://www.youtube.com/watch?v=p16frKJLVi0, various screenshots included as well.*

International Search Report of PCT/JP2011/062476 dated Jul. 12, 2011.

* cited by examiner

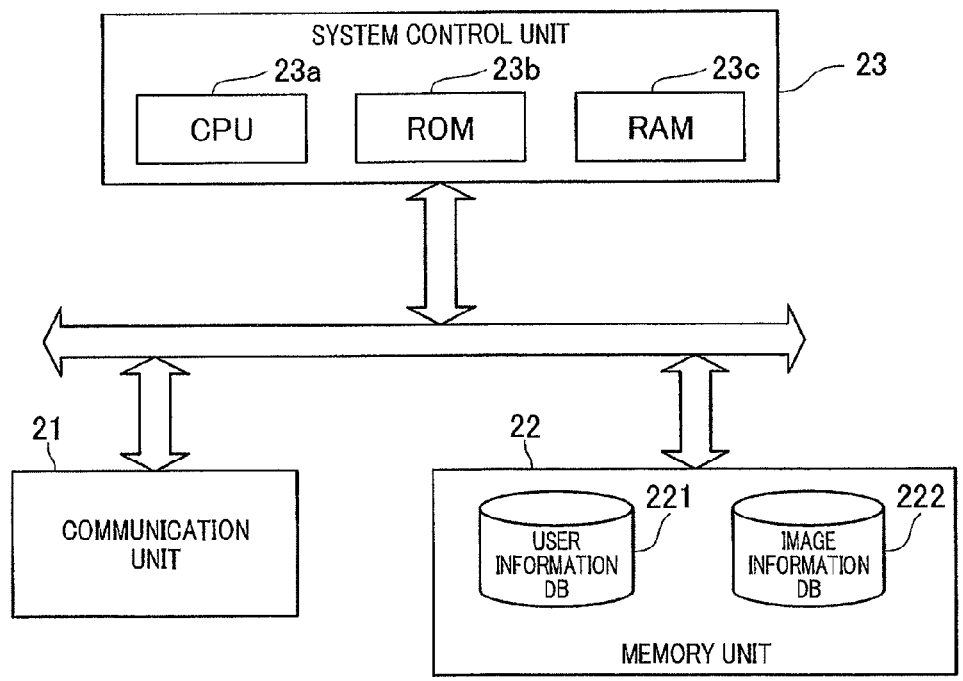

DEVICE, SYSTEM, AND PROCESS FOR SEARCHING IMAGE DATA BASED ON A THREE-DIMENSIONAL ARRANGEMENT

CROSS REFERENCE TO RELATED APPLICATIONS

This is a National Stage of International Application No. PCT/JP2011/062476 filed May 31, 2011, the content of all of which is incorporated herein by reference in its entirety.

TECHNICAL FIELD

The present invention relates to a technical field of, for example, an information providing device which can recommend useful information related to image capturing spots which match users' preferences, to the users through a network.

BACKGROUND ART

Conventionally, a search service which searches relevant information using information related to an image capturing object (for example, the sunrise, highland plants and autumnal leaves) as a key is known. According to such a search service, information corresponding to a search keyword is provided to a user terminal which is connected through the Internet, and, when an image capturing spot needs to be searched, and it is possible to search information to which relevant information is added as a comment on a captured image. Patent Literature 1 discloses a technique of setting longitude/latitude information to an extended tag portion of the Exif format and generating a position information attached original image, posting the generated image on webpages, and providing information related to an image capturing spot of a place close to an arbitrary spot upon information search using arbitrary spot information such as a current position of a user as a key.

CITATION LIST

Patent Literature

Patent Literature 1: JP Patent Laid-open No. 2002-373168

SUMMARY OF THE INVENTION

Problem to be Solved by the Invention

However, according to the above conventional technique, a user who searches an image capturing spot needs to set a search keyword which is suitable to the image capturing spot, and setting the keyword has been complicated for the user. Further, according to Patent Literature 1, information related to an image capturing spot close to an arbitrary spot set by the user based on latitude/longitude information included in image information is provided, and therefore it is difficult to efficiently recommend information related to an image capturing spot matching a user's preference based on an object (for example, a landscape such as a mountain or the sea or a person such as a family or children) included in a captured image as an image. Furthermore, when, for example, the user wants to get a desired image without going to an image capturing spot, the conventional technique has difficulty in efficiently searching and recommending an image including an image of an object (an object matching a user's preference) which the user images.

The present invention has been made in view of the above problem, and it is an object of the present invention to provide an information providing device, an information providing method, an information providing processing program, a recording medium having an information providing processing program recorded therein, and an information providing system which can efficiently search image data which includes images of objects matching users' preferences and efficiently recommend information related to image capturing spots matching the users' preferences.

Means for Solving the Problem

In order to solve the above problem, the invention according to claim 1 is an information providing device that a terminal device can access through a network, the information providing device comprising:

a receiving means that receives three-dimensional arrangement information which indicates an arrangement of an object in three-dimensional space, and line-of-sight information for specifying a point-of-view position and a line-of-sight direction in the three-dimensional space, from the terminal device;

a generating means that generates two-dimensional arrangement information which indicates, in a two-dimensional plane, an arrangement of the object projected on the two-dimensional plane based on the received three-dimensional arrangement information and line-of-sight information; and a searching means that compares arrangement information stored in a memory means that stores image data and the arrangement information which indicates, in an image, an arrangement of the object included in the image indicated by the image data, and the generated two-dimensional arrangement information, and searches for the image data based on a result of the comparison.

According to the present invention, by having the user specify an object and information for specifying an arrangement of the object, a point-of-view position and a line-of-sight direction in the three-dimensional space according to a user's preference, it is possible to efficiently search data of an image including the object matching the user's preference. Further, it is possible to efficiently recommend information related to an image capturing spot at which an image of the object arranged to match the user's preference can be captured at the point-of-view position and in the line-of-sight direction matching the user's preference.

The invention according to claim 2 is the information providing device according to claim 1, wherein the receiving means receives the line-of-sight information for specifying a plurality of pairs of point-of-view positions and line-of-sight directions;

the generating means generates a plurality of items of the two-dimensional arrangement information based on the plurality of pairs specified based on the received line-of-sight information; and the searching means compares the arrangement information stored in the memory means and the plurality of items of the generated two-dimensional arrangement information.

According to the present invention, by, for example, having the user specify a plurality of pairs of point-of-view positions and line-of-sight directions or having the user specify a range of a point-of-view position or a line-of-sight direction, a plurality of items of image data whose arrangements of the objects in the three-dimensional space are the same and whose arrangements of the objects in the image match respective point-of-view positions and line-of-sight directions are search objects. Consequently, it is possible to make it easier to find data of an image including the object which the user prefers. Further, it is possible to make it easy to find information related to an image capturing spot at which the image of the object arranged to match the user's preference can be captured. Furthermore, it is possible to search a plurality of items of image data of a single object. Still further, it is possible to recommend information related to a plurality of image capturing spots whose image capturing angles or image capturing distances of a single object are different from each other.

The invention according to claim 3 is the information providing device according to claim 2, further comprising:

a selecting means that selects two-dimensional arrangement information which indicates an arrangement which minimizes a degree of overlap of objects in the two-dimensional plane, from the plurality of the generated two-dimensional arrangement information, wherein the searching means compares the arrangement information stored in the memory means and the selected two-dimensional arrangement information.

According to the present invention, it is possible to search image data whose degree of overlap of objects in an image is low. Further, it is possible to recommend information related to an image capturing spot at which an image can be captured such that the degree of overlap of objects becomes low.

The invention according to claim 4 is the information providing device according to any one of claims 1 to 3, wherein the receiving means further receives selection information which indicates an object selected by a user from objects arranged in the three-dimensional space; and the searching means compares an arrangement of the object indicated by the received selection information among arrangements indicated by the generated two-dimensional arrangement information, and an arrangement of an object corresponding to the object indicated by the received selection information among arrangements indicated by the arrangement information stored in the memory means.

According to the present invention, an object selected by the user from objects whose arrangements are specified by the user is an arrangement comparison object, and an object corresponding to the object selected by the user from the objects in the image is an arrangement comparison object. Consequently, it is possible to search data of an image including at least the object selected by the user. Further, it is possible to recommend information related to an image capturing spot at which an image of at least the object selected by the user can be captured.

The invention according to claim 5 is the information providing device according to any one of claims 1 to 3, wherein the receiving means further receives selection information which indicates an object selected by a user from objects arranged in the three-dimensional space; and the generating means generates the two-dimensional arrangement information by excluding objects which are other than object information indicated by the received selection information among objects arranged in the three-dimensional space, from projection objects on the two-dimensional plane.

According to the present invention, a state in which objects other than the object selected by the user from the objects whose arrangements are specified by the user are not arranged is recognized. Consequently, even when the user does not cancel the specified arrangement of the objects, it is possible to search data of an image which does not include the objects other than the object selected by the user. Further, it is possible to recommend information related to an image capturing spot at which an image can be captured such that the objects other than the object selected by the user are not reflected.

The invention according to claim 6 is the information providing device according to any one of claims 1 to 5, further comprising:

a display control means that displays object candidates which represent objects arranged in the three-dimensional space, on a display screen of the terminal device such that a user can select an object candidate, wherein the receiving means receives three-dimensional arrangement information which indicates an arrangement of the object candidate which is selected by the user and which is arranged in virtual three-dimensional space, as three-dimensional arrangement information which indicates the arrangement of the object in the three-dimensional space.

According to the present invention, the user can easily specify the object and the arrangement of the object in the three-dimensional space according to the user's preference.

The invention according to claim 7 is the information providing device according to any one of claims 1 to 6, wherein the receiving means further receives color information which indicates a color of the object in the three-dimensional space; and the searching means further compares the color of the object indicated by the received color information and a color of an object included in the image indicated by the image data.

According to the present invention, by having the user further specify a color of the object, it is possible to efficiently search data of the image including the object provided at the arrangement and having the color, and matching the user's preference. Further, it is possible to efficiently recommend information related to an image capturing spot at which an image of the object having the color can be captured, to the user.

The invention according to claim 8 is the information providing device according to any one of claims 1 to 7, wherein the memory means stores position information of the image data;

the receiving means further receives condition information which indicates a condition related to the position information; and the searching means makes the comparison of the image data associated with position information which satisfies the condition indicated by the received condition information.

According to the present invention, by having the user further specify a condition related to position information, it is possible to narrow and search image data matching the condition specified by the user. Further, it is possible to narrow and recommend information related to an image capturing spot at which the image of the object matching the condition specified by the user can be captured.

The invention according to claim 9 is the information providing device according to any one of claims 1 to 8, further comprising:

a transmitting means that transmits the image data searched by the searching means, to the terminal device.

According to the present invention, it is possible to efficiently provide data of an image including the object matching the user's preference, to the user.

The invention according to claim 10 is the information providing device according to any one of claims 1 to 8, wherein the memory means stores position information of the image data; and the information providing device further comprises a transmitting means that transmits the position information of the image data searched by the searching means, to the terminal device.

According to the present invention, it is possible to efficiently provide position information of data of an image including the object matching the user's preference, to the user.

The invention according to claim 11 is an information providing method in an information providing device that a terminal device can access through a network, the information providing method comprising:

a receiving step of receiving three-dimensional arrangement information which indicates an arrangement of an object in three-dimensional space, and line-of-sight information for specifying a point-of-view position and a line-of-sight direction in the three-dimensional space, from the terminal device;

a generating step of generating two-dimensional arrangement information which indicates, in a two-dimensional plane, an arrangement of the object projected on the two-dimensional plane based on the received three-dimensional arrangement information and line-of-sight information; and a searching step of comparing arrangement information stored in a memory means that stores image data and the arrangement information which indicates, in an image, an arrangement of the object included in the image indicated by the image data, and the generated two-dimensional arrangement information, and searching for the image data based on a result of the comparison.

The invention according to claim 12 is an information providing processing program causing a computer included in an information providing device that a terminal device can access through a network, to function as:

a receiving means that receives three-dimensional arrangement information which indicates an arrangement of an object in three-dimensional space, and line-of-sight information for specifying a point-of-view position and a line-of-sight direction in the three-dimensional space, from the terminal device;

a generating means that generates two-dimensional arrangement information which indicates, in a two-dimensional plane, an arrangement of the object projected on the two-dimensional plane based on the received three-dimensional arrangement information and line-of-sight information; and a searching means that compares arrangement information stored in a memory means that stores image data and the arrangement information which indicates, in an image, an arrangement of the object included in the image indicated by the image data, and the generated two-dimensional arrangement information, and searches for the image data based on a result of the comparison.

The invention according to claim 13 is a recording medium having an information providing processing program computer-readably recorded therein, the information providing processing program causing a computer included in an information providing device that a terminal device can access through a network, to function as:

a receiving means that receives three-dimensional arrangement information which indicates an arrangement of an object in three-dimensional space, and line-of-sight information for specifying a point-of-view position and a line-of-sight direction in the three-dimensional space, from the terminal device;

a generating means that generates two-dimensional arrangement information which indicates, in a two-dimen-sional plane, an arrangement of the object projected on the two-dimensional plane based on the received three-dimensional arrangement information and line-of-sight information; and a searching means that compares arrangement information stored in a memory means that stores image data and the arrangement information which indicates, in an image, an arrangement of the object included in the image indicated by the image data, and the generated two-dimensional arrangement information, and searches for the image data based on a result of the comparison.

The invention according to claim 14 is an information providing system comprising:

a terminal device; and an information providing device that the terminal device can access through a network, wherein the terminal device comprises:

a transmitting means that transmits three-dimensional arrangement information which indicates an arrangement of an object in three-dimensional space and line-of-sight information for specifying a point-of-view position and a line-of-sight direction in the three-dimensional space, to the information providing device; and the information providing device comprises:

a receiving means that receives the three-dimensional arrangement information and the line-of-sight information transmitted from the terminal device;

a generating means that generates two-dimensional arrangement information which indicates, in a two-dimensional plane, an arrangement of the object projected on the two-dimensional plane based on the received three-dimensional arrangement information and line-of-sight information; and a searching means that compares arrangement information stored in a memory means that stores image data and the arrangement information which indicates, in an image, an arrangement of the object included in the image data, and the generated two-dimensional arrangement information, and searches for the image data based on a result of the comparison.

The invention according to claim 15 is the information providing system according to claim 14, wherein at least one of the terminal device and the information providing device further comprises:

a specifying means that specifies a reference position to which a line of sight is directed in virtual three-dimensional space;

the terminal device further comprises:

an acquiring means that acquires three-dimensional arrangement information which indicates, in virtual three-dimensional space, an arrangement of a virtual object arranged in the virtual three-dimensional space by a user's operation; and a setting means that sets the line-of-sight information by moving the point-of-view position while a direction to the reference position specified based on the point-of-view position is regarded as the line-of-sight direction, according to the user's operation; and the transmitting means transmits the acquired three-dimensional arrangement information and the set line-of-sight information.

According to the present invention, by performing an operation of moving the point-of-view position around the reference position, it is possible to set the point-of-view position and the line-of-sight direction.

The invention according to claim 16 is the information providing system according to claim 15, wherein the specifying means specifies, as the reference position, a position of a virtual object of a maximum size among virtual objects arranged in the virtual three-dimensional space.

According to the present invention, it is possible to set the point-of-view position and the line-of-sight direction such that the object of the maximum size is projected on the two-dimensional plane.

The invention according to an exemplary embodiment is the information providing system, wherein, when a plurality of virtual objects is arranged in the virtual three-dimensional space, the specifying means specifies, as the reference position, a position which is a gravity center of positions of the plurality of arranged virtual objects.

According to the present invention, it is possible to set as the reference position a position at which a balance is kept between a plurality of objects.

The invention according to an exemplary embodiment is the information providing system, wherein at least one of the terminal device and the information providing device further comprises:

a second generating means that generates a plurality of pieces of two-dimensional arrangement information which indicates, in the two-dimensional plane, the arrangement of the virtual object projected on the two-dimensional plane based on the acquired three-dimensional arrangement information, and for which at least one of point-of-view positions and line-of-sight directions is different;

the specifying means specifies the reference position on a line of a sight indicated by a point-of-view position and a line-of-sight direction used to generate two-dimensional arrangement information which minimizes a degree of overlap of virtual objects arranged in the two-dimensional plane among the plurality of pieces of the generated two-dimensional arrangement information; and the setting means sets, as a initial state, the point-of-view position and the line-of-sight direction used to generate the two-dimensional arrangement information which minimizes the degree of overlap of the virtual objects arranged on the two-dimensional plane, and changes the point-of-view position and the line-of-sight direction from the initial state according to the user's operation.

According to the present invention, it is possible to start an operation of setting point-of-view positions and line-of-sight directions from a point-of-view position and a line-of-sight direction at which the degree of overlap of objects in the two-dimensional plane becomes minimum when the objects are projected on the two-dimensional plane.

Advantageous Effects of the Invention

According to the present invention, by having a user specify an object and information for specifying an arrangement of the object, a point-of-view position and line-of-sight direction in three-dimensional space according to a user's preference, it is possible to efficiently search image data including an object matching a user's preference. Further, it is possible to efficiently recommend, to the user, information related to an image capturing spot at which the image of the object arranged to match the user's preference can be captured at the point-of-view position and in the line-of-sight direction matching the user's preference.

BRIEF DESCRIPTION OF THE DRAWINGS

FIG. 2 is a block diagram illustrating a schematic configuration example of an information providing server 2.

FIGS. 3A and 3B are views illustrating configuration examples of information to be registered in each database.

FIGS. 4A and 4B are views for explaining arrangement position information of an object included in an image indicated by image data.

MODE FOR CARRYING OUT THE INVENTION

Hereinafter, an embodiment of the present invention will be described in detail with reference to the drawings. In addition, the embodiment where the present invention is applied to an information providing system will be described below.

[1. Outline of Configuration and Function of Information Providing System]

Figure 1:
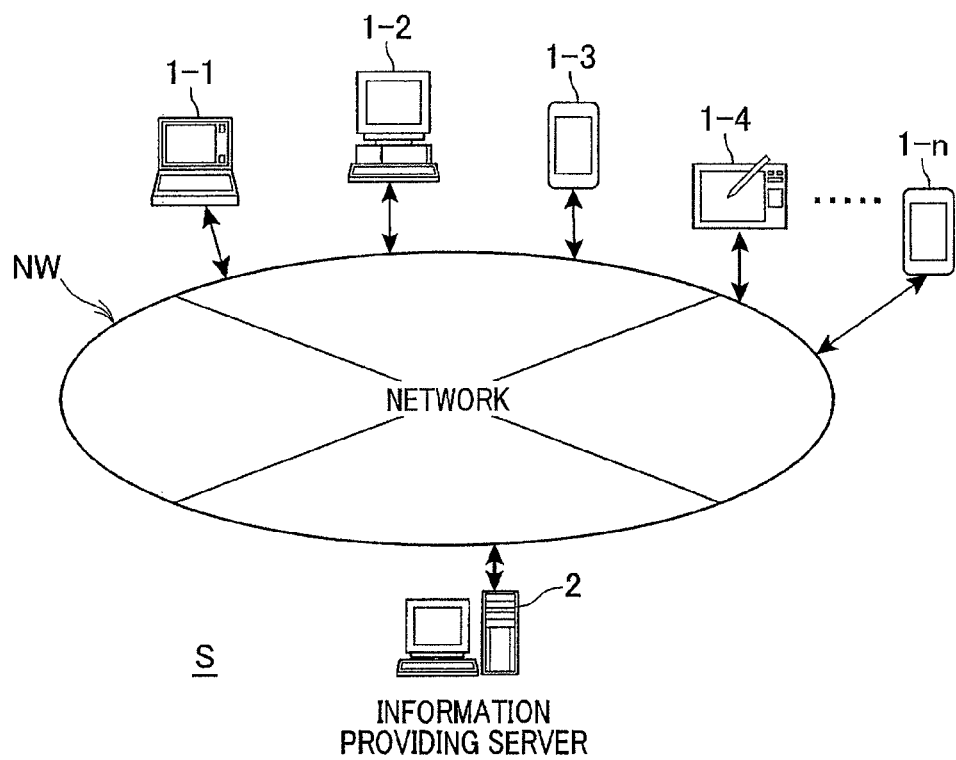
FIG. 1 is a view illustrating an example of a schematic configuration of an information providing system S according to the present embodiment.

First, an outline of a configuration and a function of an information providing system S according to the present embodiment will be described using FIG. 1. FIG. 1 is a view illustrating an example of a schematic configuration of the information providing system S according to the present embodiment.

As illustrated in FIG. 1, the information providing system S has a plurality of terminal devices 1-*k* (k=1, 2, 3, . . . and n) (an example of a terminal device), and an information providing server 2 (an example of an information providing device). The terminal device 1-*k* and the information providing server 2 can transmit and receive data to and from each other using, for example, TCP/IP for a communication protocol through a network NW. In addition, the network NW is constructed with, for example, the Internet, the dedicated communication line (for example, a CATV (Community Antenna Television) line), a mobile communication network (including, for example, base stations) and gateways.

Next, the information providing server 2 includes one or a plurality of server computers which has functions of, for example, a web server, an application server and a database server. The information providing server 2 provides an image capturing spot providing site. The image capturing spot providing site is a site which provides information (image capturing spot information) related to a spot at which an image of, for example, a landscape that a member wants to capture can be captured, in response to a request from a member.

FIG. 2 is a block diagram illustrating a schematic configuration example of the information providing server 2. As illustrated in FIG. 2, the information providing server 2 roughly has a communication unit 21, a memory unit 22 and a system control unit 23. The communication unit 21 connects to the network NW and controls a communication state with, for example, the terminal device 1-*k*. The memory unit 22 is configured by, for example, a hard disk drive, and stores an OS (Operating System), a server program (for example, an information providing processing program according to the present invention) and various items of data. In addition, for example, the information providing processing program according to the present invention may be acquired (downloaded) from, for example, a predetermined server through the network NW or may be recorded in a recording medium such as a CD (Compact Disc) or a DVD (Digital Versatile Disc) and read. Further, in the memory unit 22, a user information database (DB) 221 and an image information database (DB) 222 are constructed. The image information DB 222 of the memory unit 22 is an example of an image data memory means according to the present invention.

FIGS. 3A and 3B are views illustrating configuration examples of information to be registered in each database. In the user information DB 221 illustrated in FIG. 3A, user information such as a user ID, a password, a nickname, a name, the gender, an address, a telephone number and a mail address of a user registered as a member in the image capturing spot providing site is associated per user and registered (stored). In addition, a member is registered through a member registration procedure screen provided when, for example, the terminal device 1-*k* accesses the image capturing spot providing site, and a user ID is issued.

In the image information DB 222 illustrated in FIG. 3B, for example, image data (including a file name), an image capturing date and time of the image data, image capturing spot information of the image data (image capturing spot information which indicates an image capturing spot of the image data. An example of "position information" according to the present invention), object information which indicates an object included as an object image (an example of an object included in an image according to the present invention) in an image (an image displayed based on image data) indicated by the image data, arrangement position information of each object image in the image indicated by the image data, and an image ID for identifying the image data are associated and registered. In addition, when a plurality of object images is included in an image indicated by image data, object information and arrangement position information of each object image are registered. Although FIG. 3B illustrates an example where only one object image is included in a picture, when a plurality of object images is included, "object information" and "arrangement position information of an object image" whose numbers correspond to the number of object images are registered.

Image data to be registered in the image information DB 222 only needs to be image data which allows at least image capturing spot information to be specified. For example, (i) when image data posted to an image posting site which is separately operated by the information providing server 2 is registered, a poster is asked to transmit the image data and image capturing spot information to register. Further, (ii) when image data acquired on a webpage by a so-called crawler is registered, only image data whose image capturing spot information can be specified from webpages is registered. Meanwhile, the image capturing spot information is, for example, latitude/longitude information and address information. In addition, in case of (i), image data whose image is captured by a camera which has a GPS function is recorded together with image capturing spot information, and the poster is asked to transmit this image data. Further, in case of image data captured by a camera which does not have a GPS function, a poster is asked to specify image capturing spot information. For example, image capturing spot information may be specified on a map displayed on an image data posting screen or may be selected stepwise from a list of addresses displayed hierarchically. Further, when image data is registered, in addition to image capturing spot information, image data whose image capturing data can be acquired is preferably registered in the image information DB 222.

An object is, for example, an existing object or a virtual object. An object includes, for example, a subject in a picture related to image data. An example of an object is a person, an animal (such as a deer, a monkey, a bear or a bird), a plant (such as a flower or a highland plant), a landscape (such as a building, a bridge, a mountain, a lake, a river, the sea, a hot spring, a big tree, a forest, a waterfall, autumnal leaves, the sunrise or the sunset) or an insect. Such an object is displayed as an image in a picture related to image data registered in the image information DB 222. This image is an object image. Object information is, for example, information indicating a type of an object (for example, a "person" or a "mountain") represented by an object image. By, for example, extracting a feature amount of, for example, gradient information or edge information from image data and comparing the feature amount and a plurality of items of correct data (a reference feature amount of an object image) prepared in advance, the system control unit 23 can recognize an object. According to such an object recognition algorithm, it is possible to identify a type, a position, the number, a size and a color of objects represented in a picture related to image data. By this means, it is possible to acquire object information such as "a plurality of people", "two mountains", "a lake", "the sunset and highland plants" or "a deer and a forest" based on image data. In addition, a configuration may be employed where, when an unknown object which cannot be specified upon comparison with any correct data (known data) prepared in advance is extracted, a feature amount of this new object is registered as correct data. In this case, object information of an object for which correct data is newly registered is arbitrarily set by an administration side or is set by extracting a feature word from text information (for example, a title or a tag given to an image) associated with an unknown object. Further, a configuration may be employed where, when object information cannot be specified upon comparison with any correct data prepared in advance, a user who posts image data arbitrarily gives object information to the image data. In this case, the terminal device 1-*k* of the user transmits the image data and the object information given to the image data to the information providing server 2 to register in the image information DB 222. Further, a configuration may be employed where the information providing server 2 transmits data of an object information specifying screen for inputting or selecting object information, to the terminal device 1-*k* of the user. In this case, object information inputted by the user or selected by the user from a user object information candidate list on the user object information specifying screen displayed on the display unit 33 of the terminal device 1-*k* through the operating unit 34 is transmitted to the information providing server 2, is associated with the image data and is registered in the image information DB 222.

Figures 4A, 4B:
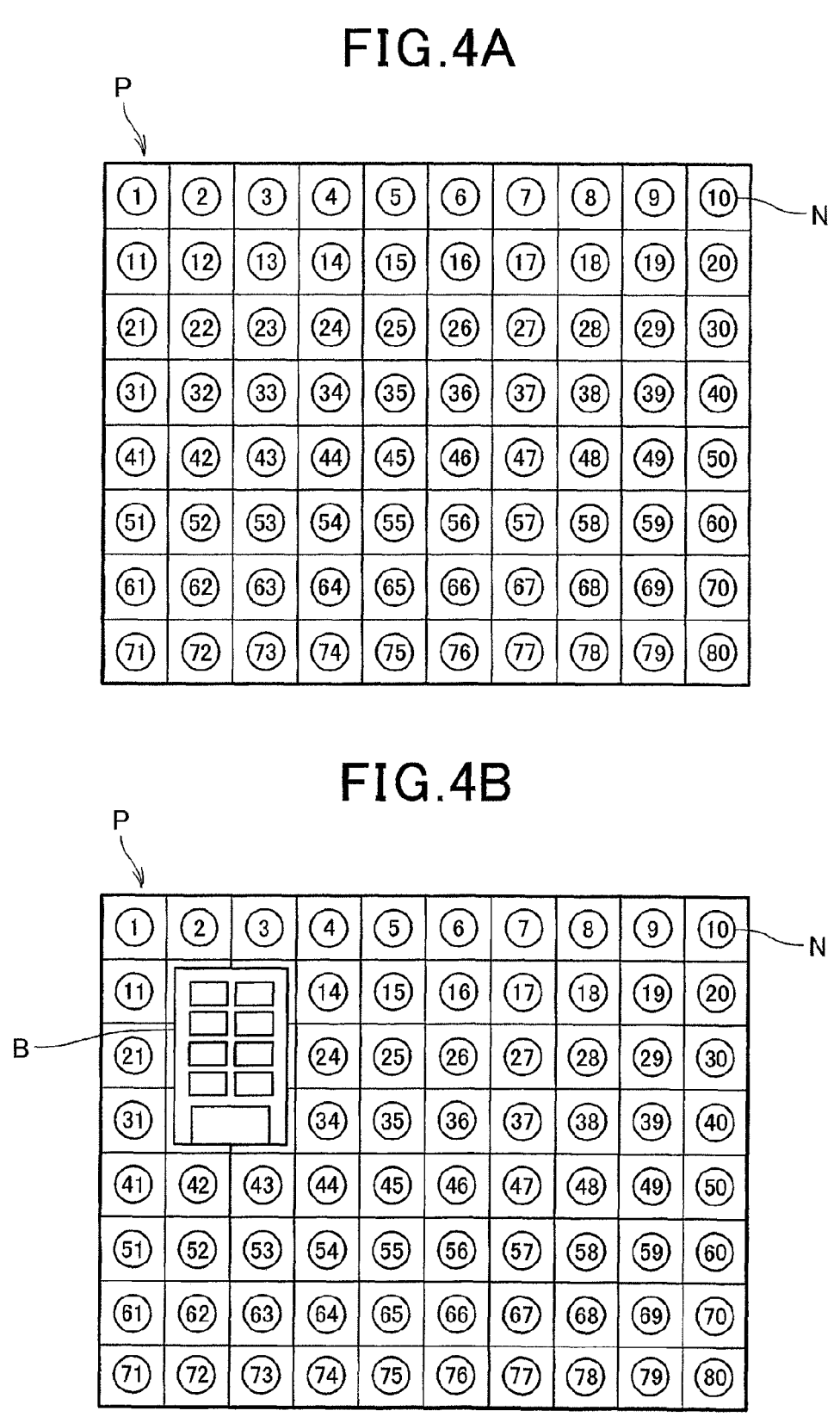

As arrangement position information of an object image to be registered in the image information DB 222, an area number N allocated to each area obtained by dividing an image P as illustrated in FIG. 4A is registered. When, for example, a building (referred to as "building" below) B is represented in areas of area numbers "12", "13", "22", "23", "32" and "33" as illustrated in FIG. 4B, these area numbers are registered as arrangement position information of an object image whose object information indicates "building". In addition, area numbers to be registered are area numbers corresponding to areas whose predetermined rate (for example, 60%) or more is occupied by an object image. Further, although the image P is divided into 80 areas in the examples in FIGS. 4A and 4B, the size or the shape of the object image may be specified in more detail by further dividing the image P.

In addition, the object recognition algorithm can adopt a technique such as known SIFT (Scale Invariant Feature Transform), and therefore will not described in more detail. Further, although an object cannot be recognized depending on some image data (there is no corresponding correct data or an image is complicated), a configuration may be employed where, when image data posted by a poster is registered, the poster is asked to input and register object information of an object image included in an image indicated by the image data and arrangement position information of the object image.

The system control unit 23 has a CPU (Central Processing Unit) 23a, a ROM (Read Only Memory) 23b and a RAM (Random Access Memory) 23c. Further, when the CPU 23a reads and executes a server program stored in the ROM 23b or the memory unit 22, the system control unit 23 functions as, for example, a receiving means, a generating means, a searching means, a selecting means, a transmitting means and a display control means according to the present invention and performs processing described below.

Figure 5:
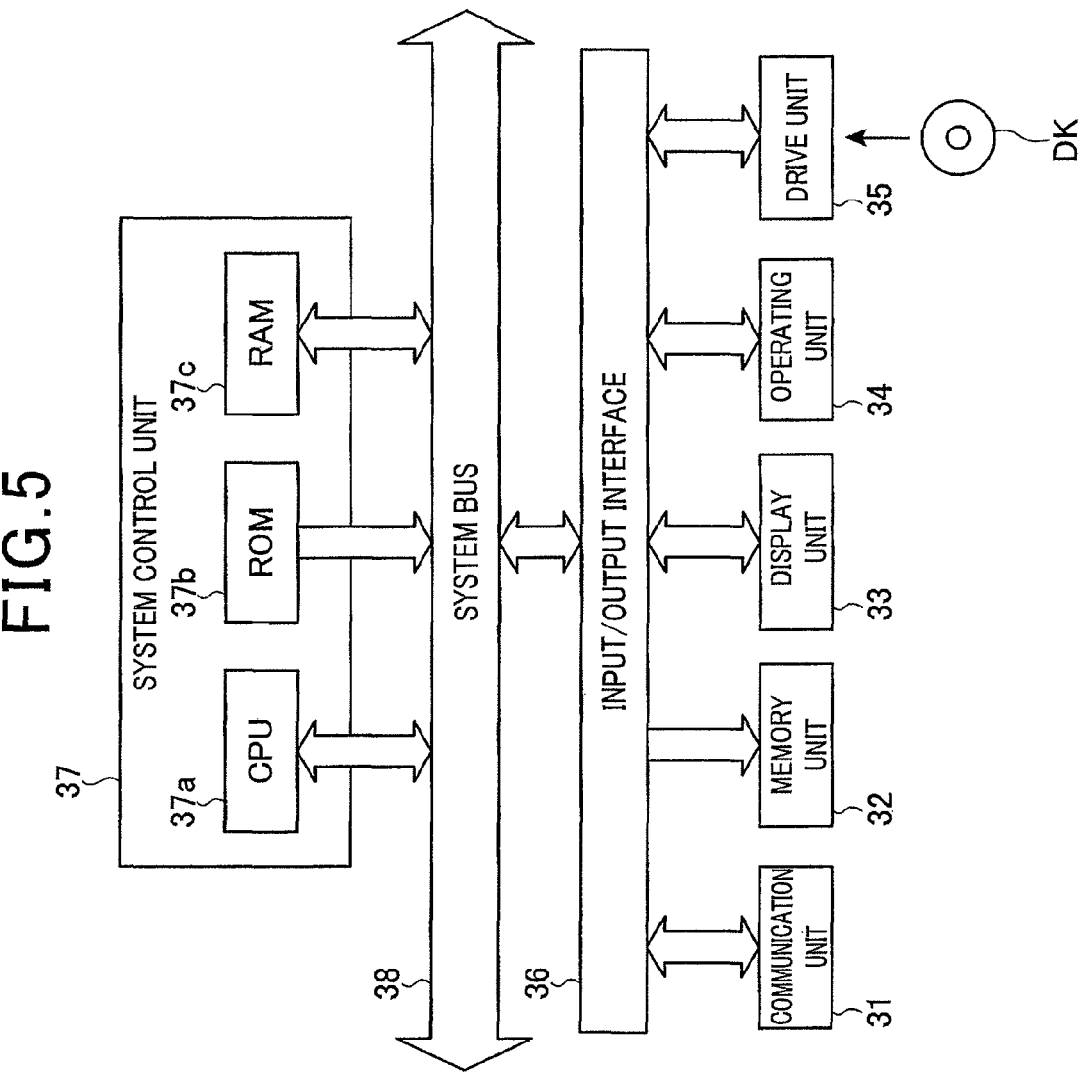
FIG. 5 is a block diagram illustrating a schematic configuration example of a terminal device 1-*k*.

Meanwhile, the terminal device 1-k is, for example, a PC (Personal Computer), a mobile telephone, a PDA or a mobile game machine used by the user. FIG. 5 is a block diagram illustrating a schematic configuration example of the user terminal 3. As illustrated in FIG. 5, the user terminal 3 has a communication unit 31, a memory unit 32, a display unit 33, an operating unit 34, a drive unit 35, an input/output interface 36 and a system control unit 37. Further, the system control unit 37 and the input/output interface 36 are connected through a system bus 38. The communication unit 31 connects to, for example, the network NW and controls a communication state with, for example, the information providing server 2. The memory unit 32 is configured by, for example, a hard disk drive or a flash memory. In this memory unit 32, programs such as the OS and the browser are stored. The display unit 33 is configured by, for example, a liquid crystal display, and displays information such as letters and images. The operating unit 34 is configured by, for example, a keyboard and a mouse or keys and a touch panel, and receives an operation command from the user and outputs the command content as a command signal to the system control unit 37. The drive unit 35 reads, for example, data from a disk DK such as a DVD or a memory card, and records, for example, data in the disk DK. The input/output interface 36 performs interface processing between the communication unit 31 to the drive unit 35, and the system control unit 37.

The system control unit 37 is configured by, for example, a CPU 37a, a ROM 37b and a RAM 37c. Further, when the CPU 37a reads and executes various programs stored in the ROM 37b or the memory unit 32, the system control unit 37 functions as a transmitting means, an acquiring means, a specifying means, a setting means and a second generating means according to the present invention.

The system control unit 37 accesses the image capturing spot providing site, and controls log-in processing. Further, when user authentication is performed by log-in processing, the system control unit 37 receives display data for displaying an object arrangement screen from the information providing server 2, and causes the display unit 33 to display the object arrangement screen. The display data includes, for example, a HTML (HyperText Markup Language) document for displaying the object arrangement screen as a webpage, a XML (Extensible Markup Language) document and image data.

Figure 6:
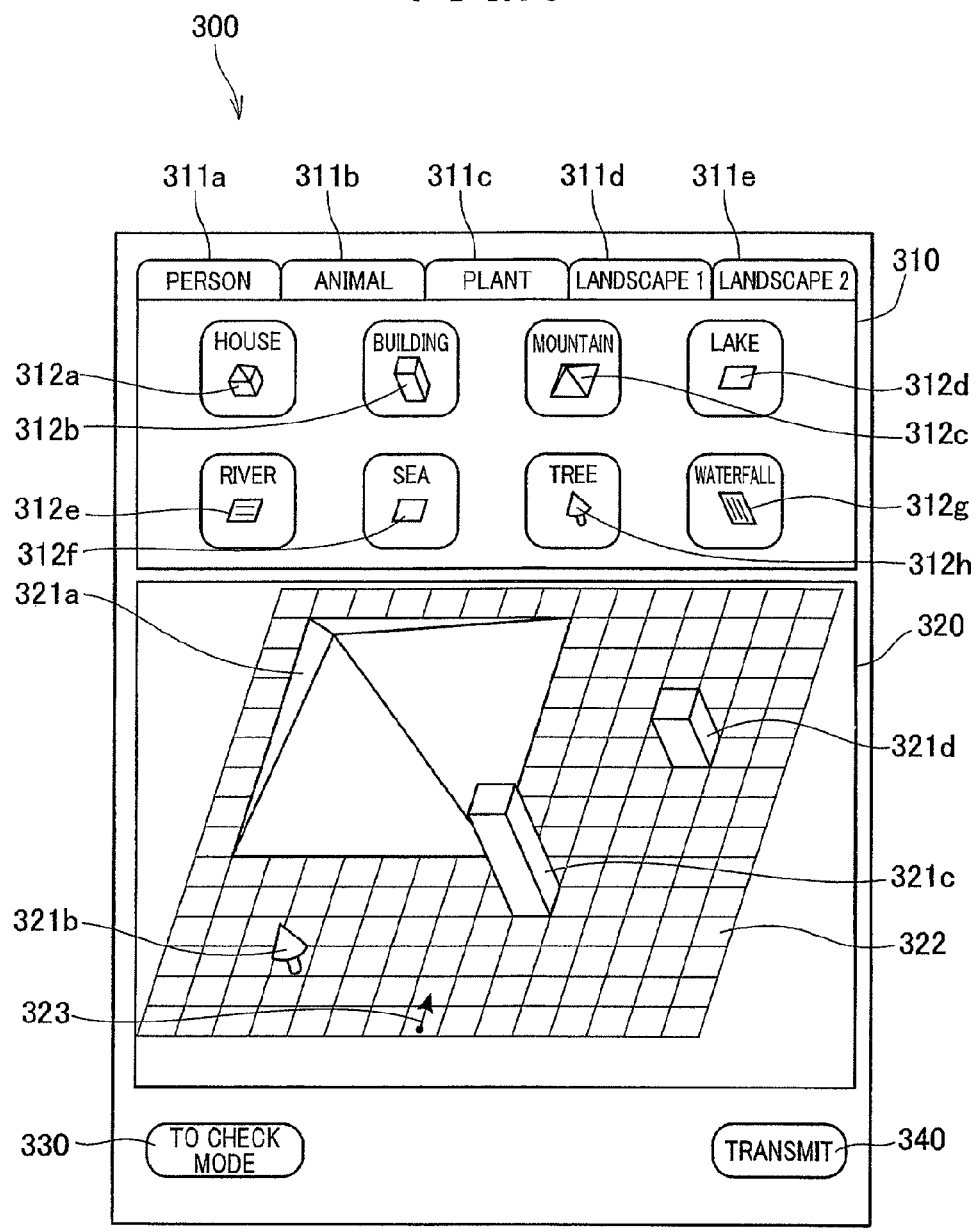
FIG. 6 is a view illustrating an example of an object arrangement screen 300.

FIG. 6 is a view illustrating an example of an object arrangement screen 300. The object arrangement screen 300 is a screen on which the user arranges virtual objects in virtual three-dimensional space. The virtual three-dimensional space is three-dimensional space which is virtual. A virtual object is an object which is arranged in the virtual three-dimensional space and is virtual. On the object arrangement screen 300, an object candidate display unit 310 which displays a list of virtual objects, an arrangement screen 320, a screen switch button 330 and a transmission button 340 are displayed.

The object candidate display unit 310 displays tabs 311 (311a to 311e) provided per genre of a virtual object (such as a person, an animal, a plant or a landscape). Object candidates 312 (312a to 312h) which belong to a genre corresponding to the tab 311 selected by the user from these tabs 311 are displayed on the object candidate display unit 310. The object candidate 312 is an image which represents a virtual object candidate as a pseudo three-dimensional image.

On the arrangement screen 320, a virtual object arrangement situation in the virtual three-dimensional space is displayed. A coordinate in the virtual three-dimensional space is defined as a world coordinate system. When, for example, the user looks at the arrangement screen 320, a coordinate axis in a horizontal direction (width direction) is an X axis. Further, a coordinate axis in a depth direction is a Y axis, and a coordinate axis in a height direction (vertical direction) is a Z axis. Lengths of the virtual three-dimensional space in the vertical, horizontal and depth directions are partitioned by a cube which is a unit distance set in advance. This cube is referred to as a block. The size of the virtual three-dimensional space is, for example, set in advance.

On the arrangement screen 320, a ground object 322 is displayed. The ground object 322 is an image which shows a ground on which virtual objects are arranged. The ground object 322 is a pseudo three-dimensional image of the ground seen when diagonally looked down on from the above. That is, on the arrangement screen 320, an image of a bird's eye view is displayed. A lattice pattern represented on the ground object 322 represents partitions of blocks on an XY plane.

Further, on the arrangement screen 320, objects 321 (321a to 321d) which represent virtual objects arranged in the virtual three-dimensional space according to a user's operation are displayed on the ground object 322. The object 321 is a pseudo three-dimensional image of a solid shape of a virtual object when diagonally looked down on from the above. The object candidate 312 which is selected by the user by way of, for example, drag and drop from the object candidates 312 displayed on the object candidate display unit 310 and is arranged on one of blocks on the ground object 322 is displayed as the object 321. Thus, the virtual object is arranged in the virtual three-dimensional space.

A virtual object can be arranged in block units. How many blocks the arranged virtual object occupies in the virtual three-dimensional space differs between the selected object candidates 312. For example, the object 321b is an image which represents a forest. The forest represented by this object 321b occupies one block. Further, the object 321d is an image which represents a building. The size of this object 321d corresponds to two blocks as the length of the height, and one block as the lengths of the width and the depth. That is, the building represented by the object 321d occupies two blocks.

The size of a virtual object arranged in the virtual three-dimensional space can be changed. For example, the user performs an operation of selecting one of the objects 321 displayed on the arrangement screen 320 by way of clicking, and then moving the object 321 in the vertical, horizontal or depth direction by way of drag and drop. Then, the size of the object 321 in a direction in which the object 321 is operated changes. Further, the size of a virtual object may be changed by inputting a numerical value. For example, when the user selects one of the objects 321 and then performs an operation such as a pop-up menu, a dialog box for inputting a numerical value is displayed in the object arrangement screen 300. In the dialog box, entry fields corresponding to the height, the width and the depth are displayed. When the user inputs numerical values in each entry field in the dialog box, the sizes of the height, the width and the depth of the selected object 321 change to sizes corresponding to the inputted numerical values. For example, the object 321a and the object 321c represent virtual objects after the sizes are changed. The object 321a is an image which represents a mountain. The lengths of the height, the width and the depth of the mountain represented by this object 321a correspond to five, seven and eight blocks, respectively. Further, the object 321c is a virtual object which represents a building. The length of the height of the building represented by this object 321c corresponds to four blocks.

Further, the objects 321 arranged in the virtual three-dimensional space can be moved in the virtual three-dimensional space or deleted from the virtual three-dimensional space by a user's operation. Furthermore, virtual objects may be arranged apart from the ground. For example, the user selects the objects 321 and then inputs the number of blocks by performing an operation such as pop-up menu. Then, the selected object 321 moves upward by the number of inputted blocks. Then, the virtual object floats in the air.

By operating the object arrangement screen 300, the user can specify virtual objects to be arranged in the virtual three-dimensional space and specify arrangements of the virtual objects based on a user's preference.

The arrangements of the virtual objects indicated by the objects 321 in the virtual three-dimensional space are indicated as three-dimensional arrangement position information (an example of three-dimensional arrangement information according to the present invention). The three-dimensional arrangement position information includes, for example, position coordinates of virtual objects and shape data which defines solid shapes of the virtual objects. The position coordinate of a virtual object is a world coordinate which indicates the position of the center of the virtual object obtained based on the position of the block at which the virtual object is arranged, and the shape of the virtual object. The shape data includes, for example, information which defines the coordinate of each apex of the virtual object, a line segment connecting each apex and a plane. The shape data is included in, for example, display data received from the information providing server 2.

In addition, an arrangement state of a virtual object may be represented by a plan view when looked down on from the above. In this case, the virtual object arranged in the virtual three-dimensional space may be represented by a plane figure. When a virtual object is represented by a plane figure, an arrangement of the virtual object in the Z axis direction cannot be checked on the arrangement screen 320. Meanwhile, even in this case, the position of the virtual object arranged in the virtual three-dimensional space is defined three-dimensionally.

On the arrangement screen 320, a line-of-sight mark 323 is further displayed. The line-of-sight mark 323 is a figure which indicates a position of a point of view and direction of a line of a sight from this point of view in the virtual three-dimensional space. That is, the line-of-sight mark 323 indicates an image capturing position and an image capturing direction at which an image of the virtual object arranged in the virtual three-dimensional space is captured. More specifically, with the line-of-sight mark 323, a point of support from which an arrow starts indicates a point of view, and a direction in which the arrow is directed indicates a line-of-sight direction. The point-of-view position and the line-of-sight direction are set to a position and a direction at which a line of sight passes the reference point in the virtual three-dimensional space. The reference point is a center point at which the point-of-view position is rotated on an object arrangement check screen 400 described below. An initial value of a coordinate (reference position) of this reference point is set in advance. For example, the reference position is set at the center of the virtual three-dimensional space in the horizontal and depth directions, and is set at a height corresponding to one block or less from the ground represented by the ground object 322. The height of the point of view in the initial state is set to, for example, the same height as the height of the reference point.

The screen switch button 330 is a button for switching the screen. More specifically, when the user pushes the screen switch button 330, the system control unit 37 receives display data for displaying the object arrangement check screen 400, from the information providing server 2 and causes the display unit 33 to display the object arrangement check screen 400 based on the received display data.

Figure 7:
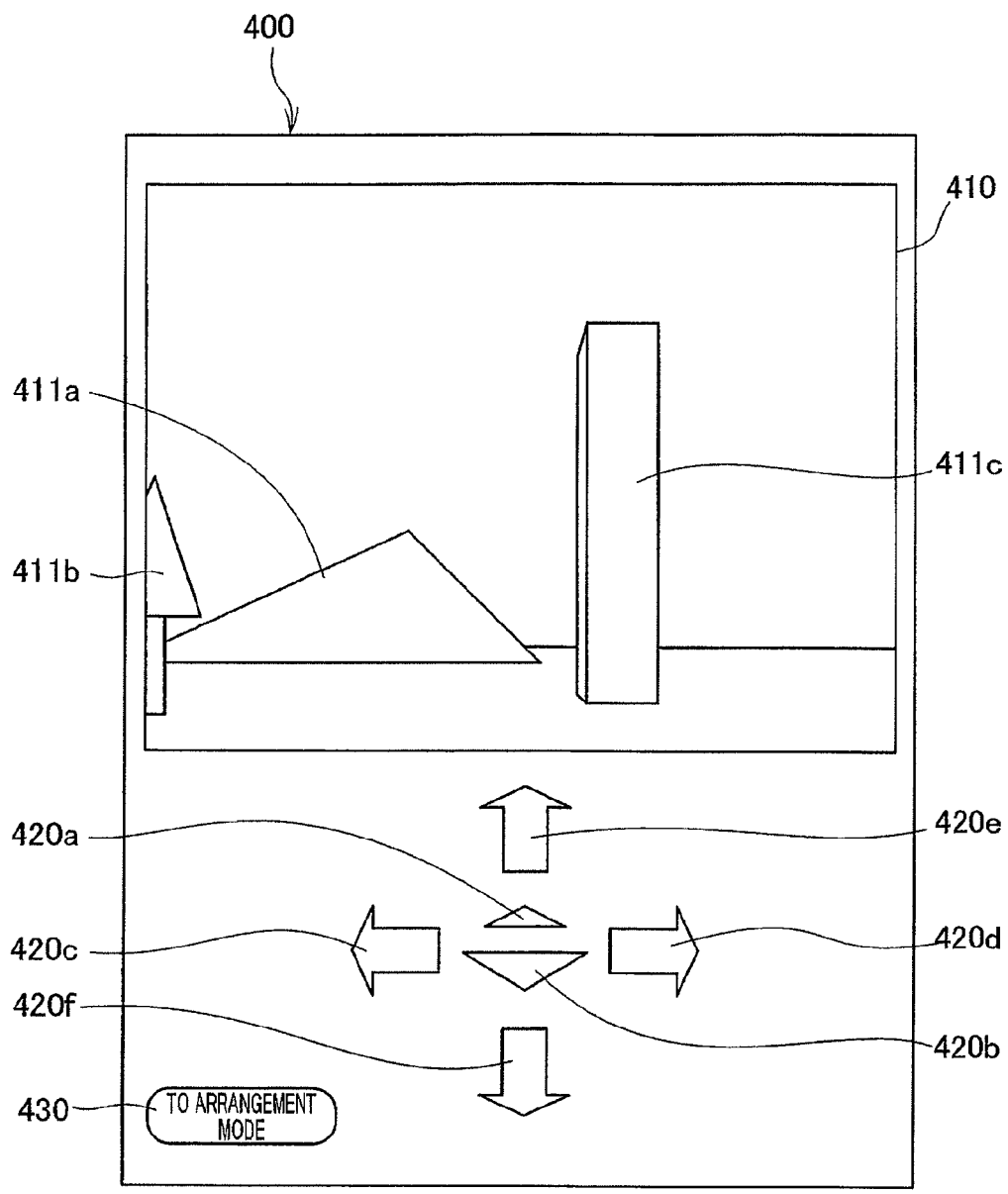
FIG. 7 is a view illustrating an example of an object arrangement check screen 400.

FIG. 7 is a view illustrating an example of the object arrangement check screen 400. The object arrangement check screen 400 is a screen for checking an arrangement of an image of a virtual object included in the image obtained when an image of the virtual object arranged in the virtual three-dimensional space is captured. On the object arrangement check screen 400, a pseudo frame 410, movement buttons 420 (420a to 420f) and a screen switch button 430 are displayed.

The pseudo frame 410 is a pseudo frame in which a projected image obtained by perspective-projecting a virtual object arranged in the virtual three-dimensional space is displayed as a three-dimensional image. More specifically, images of virtual objects seen when a line of sight is directed from the point-of-view position represented by the line-of-sight mark 323 to the line-of-sight direction represented by the line-of-sight mark 323 are displayed in the pseudo frame 410 as object three-dimensional images 411 (411a to 411c). The object three-dimensional image 411a is a three-dimensional image of the mountain represented by the object 310a. Further, the object three-dimensional image 411b is a three-dimensional image of the forest represented by the object 310b. Furthermore, the object three-dimensional image 411c is a three-dimensional image of the building represented by the object 310c. In addition, the building represented by the object 310d hides behind the building represented by the object 310c, and therefore the three-dimensional image of this building is not displayed in the pseudo frame 410.

In addition, on the object arrangement check screen 400, arrangements of virtual objects (arrangements of projected images) in the pseudo frame 410 only need to be checked, and therefore the virtual objects may not necessarily be displayed stereoscopically as three-dimensional images. For example, an image only needs to be displayed in a mode such that the user can understand boundaries between portions of virtual objects and portions without the virtual objects and the user can understand boundaries between the virtual objects.

The movement button 420 is a button for moving at least one of the point-of-view position and the line-of-sight direction in the virtual three-dimensional space. When, for example, the user pushes the movement button 420a or 420b, while the button is pushed, the point-of-view position moves in the line-of-sight direction or the opposite direction thereof. In this case, the line-of-sight direction does not change. Further, when the user pushes the movement buttons 420c, 420d, 420e or 420f, while the button is pushed, the point of view circularly moves around the reference point in a left, right, upward or downward direction. In this case, to maintain the line of sight from the moved point of view to a direction of a reference point, the line-of-sight direction changes. When the movement button 420 is operated, the point-of-view position or the line-of-sight direction changes, and three-dimensional image to be displayed in the pseudo frame 410 also changes. In addition, when the mouse is used as the operating unit 34, the point-of-view position and the line-of-sight direction may be changed according to, for example, an operation of a wheel and an operation of moving the mouse.

When the user operates the movement button 420 and checks the image to be displayed in the pseudo frame 410, the point-of-view position and the line-of-sight direction which the user prefer can be set.

The screen switch button 430 is a button for switching the screen. More specifically, when the user pushes the screen switch button 430, the system control unit 37 causes the display unit 33 to display the object arrangement screen 300. When the user changes the point-of-view position or the line-of-sight direction on the object arrangement check screen 400 and the object arrangement screen 300 is displayed, the point-of-view position or the line-of-sight direction indicated by the line-of-sight mark 323 changes.

On the object arrangement screen 300, the transmission button 340 is a button for transmitting arrangement states of virtual objects in the virtual three-dimensional space to the information providing server 2. More specifically, when the user pushes the transmission button 340, the system control unit 37 transmits a request message including user three-dimensional arrangement information and line-of-sight information, to the information providing server 2. The user three-dimensional arrangement information includes object information of each virtual object arranged in the virtual three-dimensional space and three-dimensional arrangement position information. The line-of-sight information is information for specifying the point-of-view position and the line-of-sight direction set by the user's operation. For example, the line-of-sight information includes a world coordinate of the point-of-view position and an angle indicating the line-of-sight direction.

In addition, the reference position may be changed by a user's operation. For example, the system control unit 37 displays a mark which indicates a reference point on the arrangement screen 320 of the object arrangement screen 300. By moving this mark by way of, for example, drag and drop, the user moves the reference position. Further, even on the object arrangement screen 300, the point-of-view position and the line-of-sight direction may be changed by a user's operation. For example, by moving the line-of-sight mark 323 by way of, for example, drag and drop, the user moves the point-of-view position. In this case, the line-of-sight direction does not change. At this time, the reference position moves such that the line of sight passes the reference point. Further, by moving an arrow portion of the line-of-sight mark 323 by way of, for example, drag and drop, the user rotates the line-of-sight direction around the point of view. The reference position also moves in this case. Further, when the point-of-view position and the line-of-sight direction can be changed on the object arrangement screen 300, the point-of-view position and the line-of-sight direction may not be changed on the object arrangement check screen 400. Furthermore, the terminal device 1-k may display only the object arrangement screen 300 and may not display the object arrangement check screen 400. In this case, based on an arrangement situation of the objects 321 displayed on the arrangement screen 320 and the line-of-sight mark 323, the user can perform an arranging operation while imaging arrangements of virtual objects in the pseudo frame 410. Further, on the object arrangement check screen 400, a transmission button for transmitting a request message may be displayed. In this case, when the user pushes the transmission button displayed on the object arrangement check screen 400, a request message including the same information as that in case that the transmission button 340 is pushed is transmitted to the information providing server 2. Further, when the object arrangement check screen 400 is configured such that the transmission button is displayed, the transmission button 340 may not be displayed on the object arrangement screen 300.

[2. Operation of Information Providing System]

Next, object arrangement check processing of the terminal device 1-k will be described using FIG. 8. The object arrangement check processing is processing of the terminal device 1-k upon display of the object arrangement check screen 400.

Figure 8:
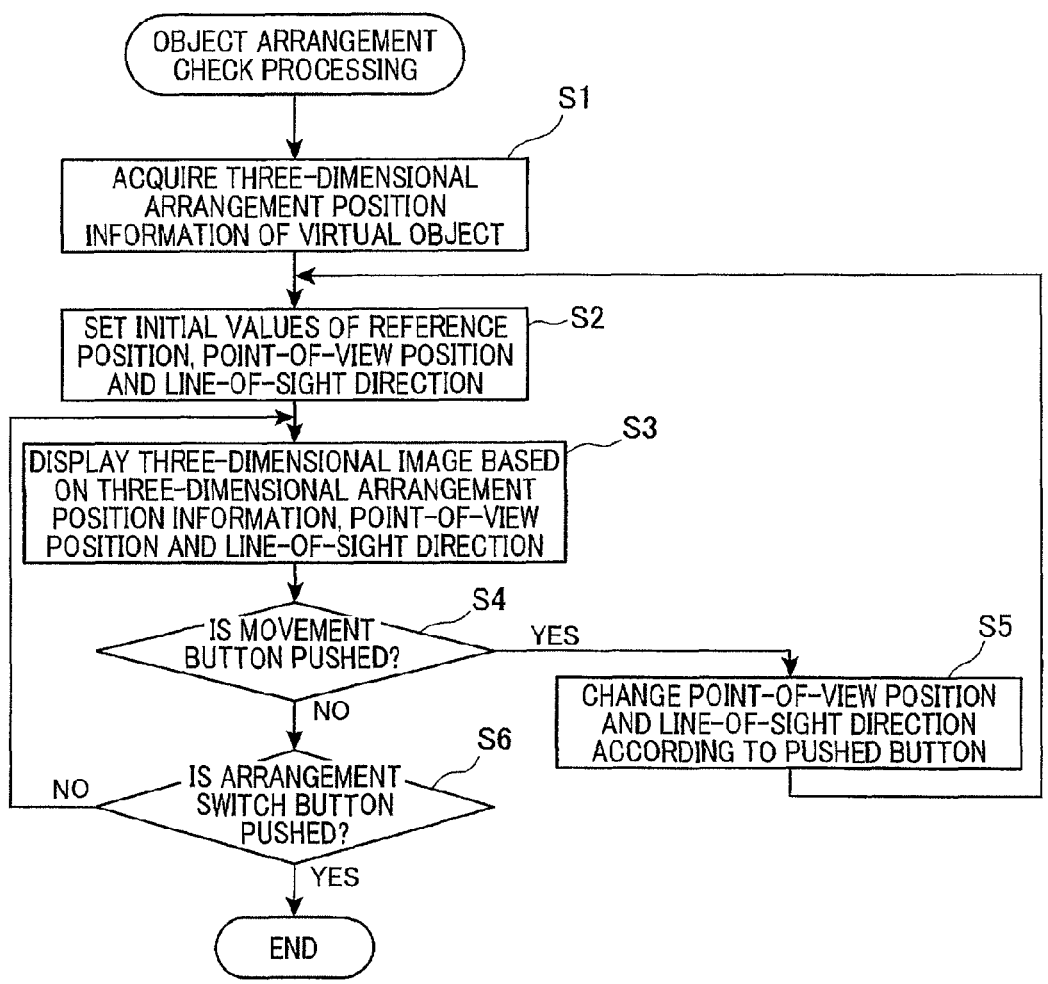
FIG. 8 is a flowchart illustrating object arrangement check processing by a system control unit 37 of the terminal device 1-*k*.

FIG. 8 is a flowchart illustrating object arrangement check processing of the system control unit 37 of the terminal device 1-k. The object arrangement check processing is started when the user pushes the screen switch button 330 in a state where the terminal device 1-k displays the object arrangement screen 300 and then the object arrangement check screen 400 is displayed.

In FIG. 8, the system control unit 37 acquires three-dimensional arrangement position information of each virtual object arranged in the virtual three-dimensional space (step S1). Next, the system control unit 37 specifies initial values of the reference position, the point-of-view position and the line-of-sight direction in the virtual three-dimensional space (step S2). For example, the system control unit 37 acquires coordinates of the reference position set in advance, the point-of-view position and the line-of-sight direction as initial values from display data received from the information providing server 2.

Next, the system control unit 37 displays the object three-dimensional images 411 on the pseudo frame 410 based on the three-dimensional arrangement position information and the specified point-of-view position and line-of-sight direction (step S3). More specifically, the system control unit 37 defines in the virtual three-dimensional space a world coordinate of a projection plane (an example of a two-dimensional plane according to the present invention) on which virtual objects are projected. This projection plane corresponds to the pseudo frame 410, and is a plane having vertical and horizontal lengths set in advance. Further, this projection plane takes as a normal line a line of sight indicated by the point-of-view position and the line-of-sight direction, and is positioned at a distance set in advance from the point-of-view position. Next, the system control unit 37 calculates, for example, the world coordinate of each apex of a virtual object based on a position coordinate and shape data of the virtual object included in the three-dimensional arrangement position information. Next, the system control unit 37 perspective-projects each virtual object on the projection plane while directing each virtual object toward the point-of-view position based on, for example, each apex of the virtual object, and the world coordinates of the projection plane and the point-of-view position. Meanwhile, the system control unit 37 converts a world coordinate of a projected image of a virtual object which is on the projection plane and which is obtained by projection, into a screen coordinate. The screen coordinate is a coordinate of a two-dimensional coordinate system which adopts as an X axis a coordinate axis in the horizontal direction of the pseudo frame 410 (projection plane) and adopts as a Y axis the coordinate axis in the vertical direction of the pseudo frame 410 (projection plane). Next, the system control unit 37 generates a frame image (an image having the same display size as that of the pseudo frame 410) including each object three-dimensional image 411 based on the screen coordinate of each virtual object. In this case, the system control unit 37 performs processing such as hidden surface removal. Further, the system control unit 37 displays the generated frame image in the pseudo frame 410. By this means, on the pseudo frame 410, the object three-dimensional images 411 illustrated in FIG. 7 are displayed.

Next, the system control unit 37 determines whether or not the movement button 420 is pushed (step S4). In this case, when determining that the movement button 420 is pushed (step S4: YES), the system control unit 37 changes at least one of the point-of-view position and the line-of-sight direction according to the pushed movement button 420 (step S5). When, for example, the user pushes the movement button 420a or 420b, the system control unit 37 moves the point-of-view position a predetermined distance in the line-of-sight direction or in the direction opposite to the line-of-sight direction. Further, when the movement button 420c, 420d, 420e or 420f is pushed, the system control unit 37 circularly moves the point-of-view position a predetermined distance around the reference position in the left, right, upward or downward direction. In this case, the system control unit 37 changes the line-of-sight direction such that the line of sight passes the reference point. When changing the point-of-view position or the line-of-sight direction, the system control unit 37 generates and displays a frame image including the object three-dimensional images 411 using the changed point-of-view position and line-of-sight direction (step S3).

Meanwhile, when determining that the movement button 420 is not pushed (step S4: NO), the system control unit 37 determines whether or not the screen switch button 430 is pushed (step S6). In this case, when determining that the screen switch button 430 is not pushed (step S6: NO), the system control unit 37 moves to step S4. Meanwhile, when determining that the screen switch button 430 is pushed (step S6: YES), the system control unit 37 finishes object arrangement check processing. Subsequently, the system control unit 37 causes the display unit 33 to display the object arrangement screen 300.

Next, processing of recommending image capturing spot information by the information providing server 2 will be described using FIGS. 9 and 10.

Figure 9:
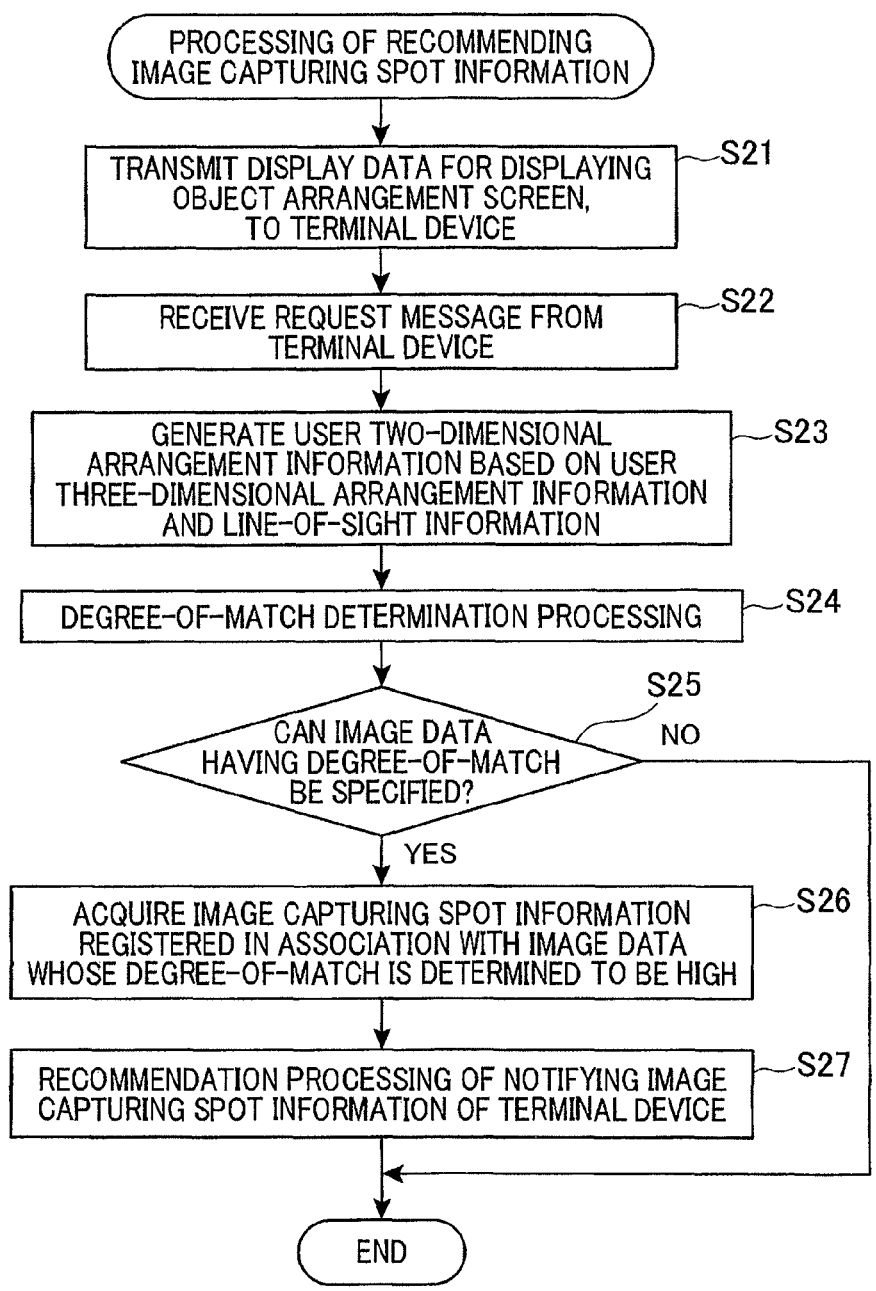
FIG. 9 is a flowchart illustrating processing of recommending spot information by a system control unit 23 of the information providing server 2.

FIG. 9 is a flowchart illustrating processing of recommending image capturing spot information by the system control unit 23 of the information providing server 2. In addition, the processing illustrated in FIG. 9 is started when the terminal device 1-*k* accesses, for example, the image capturing spot providing site and user authentication is performed by log-in processing.

In FIG. 9, the system control unit 23 of the information providing server 2 transmits display data for displaying the object arrangement screen 300 to the terminal device 1-*k* (step S21). The terminal device 1-*k* which received this display data causes the display unit 33 to display the object arrangement screen 300. Subsequently, the system control unit 23 transmits display data of the object arrangement check screen 400 or transmits display data of the object arrangement screen 300 in response to a message transmitted when the user pushes the screen switch button. Further, as described above, when the user pushes the transmission button 340 in a state where the objects 321 are arranged, the terminal device 1-*k* transmits a request message including user three-dimensional arrangement information and line-of-sight information to the information providing server 2.

When receiving the request message from the terminal device 1-*k* (step S22), the system control unit 23 of the information providing server 2 generates user two-dimensional arrangement information based on the user three-dimensional arrangement information and line-of-sight information included in the request message (step S23). The user two-dimensional arrangement information is information which indicates an arrangement in a projection plane of a projected image (an example of an object projected on the two-dimensional plane according to the present invention) which appears on the projection plane when a virtual object is projected on the projection plane defined based on the point-of-view position and the line-of-sight direction. The user two-dimensional arrangement information includes arrangement position information (an example of two-dimensional arrangement information according to the present invention) of each virtual object projected on the projection plane. Content of this arrangement position information is the same as content of arrangement position information registered in the image information DB 222. The system control unit 23 projects virtual objects arranged in the virtual three-dimensional space, on the projection plane similar to processing in step S3 of object arrangement check processing. By this means, the system control unit 23 calculates two-dimensional coordinates of the virtual objects (projected images) on the projection plane. This two-dimensional coordinate is a coordinate of the two-dimensional coordinate system which adopts as the X axis the coordinate axis in the horizontal direction of the projection plane and adopts as the Y axis the coordinate axis in the vertical direction of the projection plane, and is basically the same as the screen coordinate of the above pseudo frame 410. Next, the system control unit 23 generates user two-dimensional arrangement information based on the two-dimensional coordinate of each virtual object.

Figure 10:
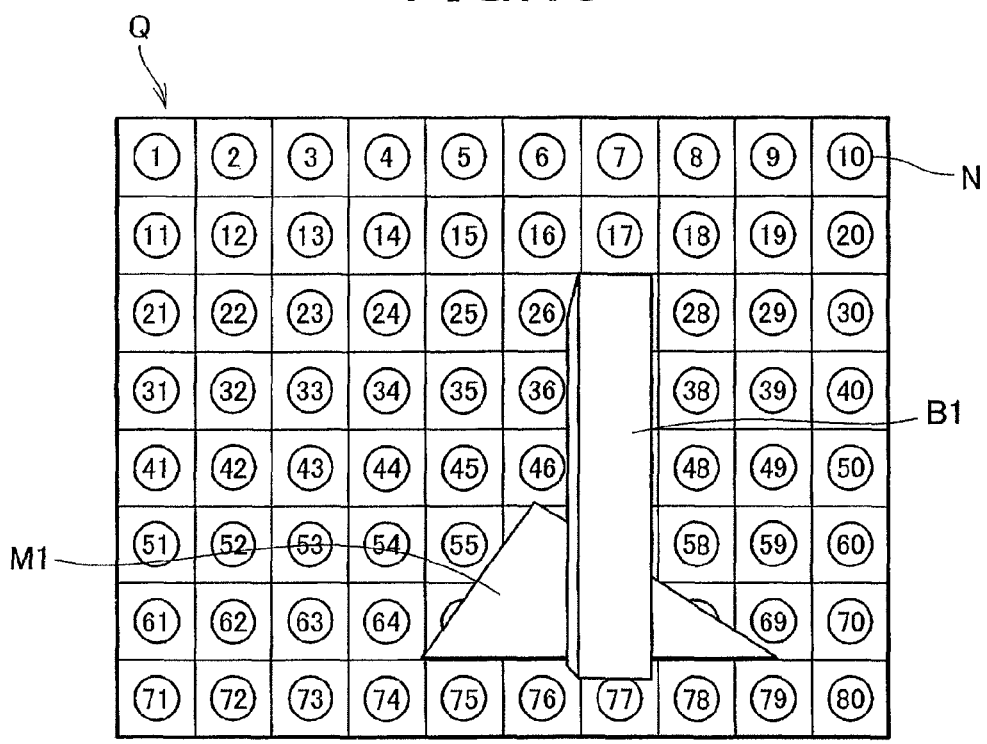
FIG. 10 is a view for explaining arrangement position information of user two-dimensional arrangement information of a virtual object arranged by a user.

FIG. 10 is a view for explaining arrangement position information of user two-dimensional arrangement information of a virtual object arranged by the user. As illustrated in FIG. 10, similar to image data registered in the image information DB 222, a projection plane Q is divided into a plurality of areas. Further, the area number N is allocated to each area. The numbers of divisions of the height and the width are the same as those of image data registered in the image information DB 222. Similar to arrangement position information to be registered in the image information DB 222, the system control unit 23 specifies an area (for example, an area whose predetermined rate is occupied by a projection image) in which the projected virtual object is represented. For example, a mountain M1 appears in areas of area numbers "56", "65", "66" and "68". Further, a building B1 appears in areas of area numbers "27", "37", "47", "57" and "67". Thus, the system control unit 23 generates arrangement position information per virtual object by specifying areas in which each virtual object appears. Further, the system control unit 23 generates user two-dimensional arrangement information including arrangement position information of each virtual object projected on the projection plane.

Next, the system control unit 23 performs degree-of-match determination processing (step S24). More specifically, the system control unit 23 determines whether or not the degree-of-match is high by comparing the object information included in the user three-dimensional arrangement information and the arrangement position information included in the generated user two-dimensional arrangement information, and the object information and the arrangement position information registered in the image information DB 222, and searches image data based on a determination result of the degree-of-match (searches image data based on the above comparison result). When, for example, all pieces of the object information included in the user three-dimensional arrangement information and object information of objects included as object images in an image indicated by image data registered in the image information DB 222 match, and all area numbers of arrangement position information of the matching object information match, it is determined that the degree-of-match is high. Further, all pieces of the object information included in the user three-dimensional arrangement information and object information of objects included in the image indicated by image data registered in the image information DB 222 match and a predetermined rate (for example, 70%) or more of area numbers of arrangement position information of the matching object information match, it may be determined that the degree-of-match is high. Furthermore, when at least part of object information included in the user three-dimensional arrangement information and object information of at least part of objects included in an image indicated by image data registered in the image information DB 222 match, and all or a predetermined rate of area numbers of arrangement position information of the matching objects match, the system control unit 23 may determine that the degree-of-match is high.

Still further, the system control unit 23 may calculate the degree-of-match of each virtual object projected on the projection plane and each object included in an image indicated by image data registered in the image information DB 222, calculate the entire degree-of-match based on each calculated degree-of-match and determine the degree-of-match. For example, the system control unit 23 specifies a virtual object and an object which have a correspondence relationship from virtual objects projected on the projection plane and objects included in the image indicated by the image data. More specifically, the system control unit 23 specifies a virtual object and an object whose object information match and which have a correspondence relationship. Meanwhile, when there is at least one of a plurality of virtual objects and a plurality of objects whose object information match (when, for example, the number of virtual objects of buildings is three and the number of objects of buildings is two), the system control unit 23 specifies a virtual object and an object whose arrangements indicated by arrangement position information are the most similar, as the virtual object and the object which have the correspondence relationship. Further, the system control unit 23 calculates the degree-of-match of the arrangement between the virtual object and the object which have the correspondence relationship. When, for example, a rate that area numbers match is higher between arrangement position information of a virtual object and an object which have the correspondence relationship, the degree-of-match is higher. Further, when, for example, a distance between areas indicated by area numbers between arrangement position information of a virtual object and an object is shorter, the degree-of-match may be made higher. For example, it is assumed that a virtual object appears in the area of the area number "12". Meanwhile, when an object included in an image appears in the area of the area number "12", for example, the degree-of-match indicates the highest value. Further, when, for example, an area of the area number "23", "34" or "45" in which the object appears becomes farther apart from the area in which the virtual object appears, the degree-of-match becomes lower according to the distance. In addition, there is no object which has a correspondence relationship with the virtual objects projected on the projection plane, for example, the lowest degree-of-match which can be set is set as the degree-of-match of this virtual object. Further, also when there is no virtual object which has a correspondence relationship with objects included in an image indicated by image data, for example, the lowest degree-of-match which can be set is set as the degree-of-match of this object. The system control unit 23 calculates the entire degree-of-match by calculating, for example, an entire average value of the degrees of match between virtual objects and objects which have correspondence relationships. Further, when, for example, the entire degree-of-match is a predetermined value or more, the system control unit 23 determines that the degree-of-match is high. Furthermore, the system control unit 23 may specify image data whose relatively high degree-of-match is calculated as the entire degree-of-match among image data registered in the image information database 222, as image data whose degree-of-match is high. That is, upon comparison with another image data, image data whose arrangement of a virtual object on the projection plane is similar to the arrangement of an object in an image is set as image data whose degree-of-match is high. In this case, the system control unit 23 may specify image data from which the highest degree-of-match is calculated among image data registered in the image information database 222, as image data whose degree-of-match is high. Alternatively, the system control unit 23 may specify image data whose calculated degree-of-match is the highest to image data whose degree-of-match is the predetermined number highest, as image data whose degrees of match are high. The degree-of-match is determined based on arrangement position information, so that it is possible to efficiently search image data including object information matching a user's preference.

When image data whose degree-of-match is high cannot be specified by the search (step S25: NO), the system control unit 23 finishes the processing illustrated in FIG. 9. Meanwhile, when image data whose degree-of-match is high can be specified by the search (step S25: YES), the system control unit 23 moves to step S26.

In step S26, the system control unit 23 acquires from the image information DB 222 at least one of image data specified based on a determination result of the degree-of-match and image capturing spot information (image capturing spot information indicating an image capturing spot of the image data) registered in association with the image data.

Further, the system control unit 23 executes recommendation processing of transmitting to the terminal device 1-$k$ at least one of the acquired image data and image capturing spot information (step S27). At least one of the image data and the image capturing spot information transmitted in this way is displayed on the screen of the display unit 33 of the terminal device 1-$k$, and is notified to the user. Thus, information related to an image capturing spot (image data and image capturing spot information which indicates an image capturing spot of the image data) is recommended to the user.

In addition, a configuration may be employed where, upon the recommendation processing, at least one of these image data and image capturing spot information is described in an electronic mail, and this electronic mail is transmitted to a mail address of the user.

As described above, according to the above embodiment, the information providing server 2 generates user two-dimensional arrangement information based on three-dimensional arrangement position information included in user three-dimensional arrangement information received from the terminal device 1-$k$ and line-of-sight information, compares object information of an object included in an image indicated by image data registered in the image information DB 222 and arrangement position information of the object information, and object information included in the user three-dimensional arrangement information and arrangement position information included in the user two-dimensional arrangement information, and searches image data based on this comparison result, so that it is possible to efficiently search image data of the image including the object matching the user's preference. Further, the information providing server 2 notifies the user of the terminal device 1-$k$ about at least one of the searched image data and image capturing spot information of the image data. By this means, by having the user of the terminal device 1-$k$ specify an object, and an arrangement position of the object, a point-of-view position and a line-of-sight direction in three-dimensional space according to a user's preference, it is possible to efficiently recommend information related to an image capturing spot at which an image of the object can be captured at the point-of-view position and in the line-of-sight direction matching the user's preference.

Further, the system control unit 23 of the information providing server 2 transmits display data of the object arrangement screen 300 for displaying the object candidates 312 which indicate candidates of objects to be arranged in virtual three-dimensional space on the display screen of the terminal device 1-$k$ such that the user can select an object candidate, and further receives object information of the candidate of the object which is indicated by the object candidate 312 selected by the user and which is arranged in the virtual three-dimensional space, and arrangement position information of the candidate. By this means, the user can easily specify the object and an arrangement position of the object according to the user's preference.

Further, by acquiring three-dimensional arrangement position information which indicates, in the virtual three-dimensional space, arrangements of virtual objects arranged in the virtual three-dimensional space by the user's operation, specifying a reference position to which a line of sight is directed in the virtual three-dimensional space, and moving a point-of-view position while setting a direction form a point-of-view position to the reference position as a line-of-sight direction according to the user's operation, the terminal device 1-$k$ sets the point-of-view position and the line-of-sight direction and transmits the acquired three-dimensional arrangement position information and line-of-sight information which indicates the set point-of-view position and line-of-sight direction, to the information providing server 2. Consequently, when the user performs an operation of moving the point-of-view position around the reference position, it is possible to set the point-of-view position and the line-of-sight direction.

In addition, according to the above embodiment, line-of-sight information included in a request message transmitted from the terminal device 1-$k$ indicates only a pair of a point-of-view position and a line-of-sight direction. However, line-of-sight information may be information which allows a plurality of pairs of point-of-view positions and line-of-sight directions to be specified. Further, in step S23, the information providing server 2 may generate a plurality of pieces of user two-dimensional arrangement information based on a plurality of pairs of point-of-view positions and line-of-sight directions, and search image data per user two-dimensional arrangement information.

For example, when the user operates the movement buttons 420 on the object arrangement check screen 400, a point-of-view position and a line-of-sight direction in case that arrangements of the object three-dimensional images 411 displayed on the pseudo frame 410 are provided as arrangements which the user prefers can be stored in, for example, the RAM 37$c$. The point-of-view position and the line-of-sight direction can be stored by, for example, pushing a predetermined button on the object arrangement check screen 400. The user stores a plurality of pairs of point-of-view positions and line-of-sight directions, and pushes the transmission button 340 on the object arrangement screen 300. Then, the terminal device 1-$k$ transmits to the information providing server 2 a request message which includes line-of-sight information including a plurality of pairs of point-of-view positions and line-of-sight directions stored so far. The system control unit 23 of the information providing server 2 which received the request message generates user two-dimensional arrangement information per pair of a point-of-view position and a line-of-sight direction. Further, per generated user two-dimensional arrangement information, the system control unit 23 compares object information of an object included in an image indicated by image data registered in the image information DB 222 and arrangement position information of the object information, and object information included in user three-dimensional arrangement position information and arrangement position information included in user two-dimensional arrangement information. Furthermore, the system control unit 23 searches image data per generated user two-dimensional arrangement information.

Still further, the user may be allowed to specify a range of at least one of a point-of-view position and a line-of-sight direction, and the information providing server 2 may specify a plurality of pairs of point-of-view positions and line-of-sight directions in a specified range. For example, the user is allowed to specify a range of a distance from a reference point to a point of view on the object arrangement screen 300 or the object arrangement check screen 400, or the user is allowed to specify a range of a line-of-sight direction (for example, a range of an angle of a line of sight and a length of an arc which is around the reference point and on which the line of sight can be positioned) around the reference point. The terminal device 1-$k$ transmits a request message including line-of-sight information including a range specified by the user, to the information providing server 2. The system control unit 23 of the information providing server 2 specifies a plurality of pairs of point-of-view positions and line-of-sight directions based on line-of-sight information. For example, the system control unit 23 may specify a point-of-view position or a line-of-sight direction per predetermined distance or predetermined angle within the specified range, or may specify a predetermined number of point-of-view positions or line-of-sight directions at equal intervals within the specified range. In addition, a distance interval and an angle interval for specifying a plurality of point-of-view positions and line-of-sight directions, and the numbers of point-of-view positions and line-of-sight directions to be specified may be specified by the user, and the specified information may be included in line-of-sight information and transmitted to the information providing server 2. The system control unit 23 specifies a plurality of pairs of point-of-view positions and line-of-sight directions by calculating a plurality of point-of-view positions or line-of-sight directions.

Image data is searched based on a plurality of pairs of point-of-view positions and line-of-sight directions, so that a plurality of items of image data whose arrangements of objects in the three-dimensional space are the same and whose arrangements of objects in the image are provided in arrangements matching the respective point-of-view positions and the line-of-sight directions become search objects. Consequently, it is possible to easily find data of an image including an object which the user prefers. Further, it is possible to easily find information related to an image capturing spot at which an image of an object arranged to match a user's preference can be captured. Furthermore, it is possible to search a plurality of items of image data of a single object. Still further, it is possible to recommend information related to a plurality of image capturing spots of a single object whose image capturing angles and image capturing distances are different from each other.

Meanwhile, the system control unit 23 may select user two-dimensional arrangement information which indicates an arrangement which minimizes the degree of overlap of virtual objects in the projection plane among a plurality of pieces of user two-dimensional arrangement information generated based on a plurality of pairs of point-of-view positions and line-of-sight directions, compare only arrangement position information included in the selected user two-dimensional arrangement information and arrangement position information registered in the image information DB 222 and search image data.

For example, on a projection plane Q illustrated in FIG. 10, a mountain M1 and a building B1 overlap in areas of the area numbers "57" and "67". The mountain M1 is farther from the point of view than the building B1, and therefore the building B1 is preferentially displayed in the areas of the area numbers "57" and "67". In this case, virtual objects in two areas overlap. The system control unit 23 may calculate for each user two-dimensional arrangement information the number of areas in which virtual objects overlap, and select user two-dimensional arrangement information whose number of areas in which the virtual objects overlap is the lowest. Further, the system control unit 23 may calculate for each user two-dimensional arrangement information a rate of an area in which virtual objects overlap in the area which the virtual objects occupy, and select two-dimensional arrangement information whose rate of the area in which the virtual objects overlap is the lowest. In the example in FIG. 10, the number of areas which the virtual objects occupy is nine, and therefore a rate of areas in which the virtual objects overlap is $2/9$.

Consequently, it is possible to search image data whose degree of overlap of objects in an image is low. Further, it is possible to recommend information related to an image capturing spot at which an image can be captured such that the degree of overlap of objects is low.

Further, the user may be allowed to select one or more virtual objects from virtual objects arranged in the virtual three-dimensional space on the object arrangement screen 300 or the object arrangement check screen 400, and the information providing server 2 may compare object information of the virtual object selected by the user and arrangement position information of the object information, and object information of an object corresponding to the virtual object selected by the user from objects included in an image indicated by image data registered in the image information DB 222 and arrangement position information of the object information, and search image data.

For example, the terminal device 1-$k$ transmits to the information providing server 2 a request message including selected object information (an example of selection information according to the present invention) which indicates the virtual object selected by the user. The system control unit 23 of the information providing server 2 specifies object information of the virtual object selected by the user and three-dimensional arrangement position information based on the selected object information. The system control unit 23 may generate or may not generate arrangement information for virtual objects which are not selected by the user upon generation of user two-dimensional arrangement information in step 23. The system control unit 23 specifies an object corresponding to the virtual object selected by the user, from objects included as object images in an image indicated by image data registered in the image information DB 222, upon degree-of-match determination processing in step 24. For example, the system control unit 23 specifies as a corresponding object an object (for example, an object occupying the greatest number of matching area numbers) whose object information matches object information of the selected virtual object and whose arrangement indicated by arrangement position information is the most similar to the arrangement indicated by the arrangement position information of the selected virtual object. Further, the system control unit 23 compares arrangement position information of the virtual object selected by the user and an object corresponding to this virtual object. Meanwhile, the system control unit 23 does not compare arrangement position information of virtual objects which are not selected by the user and objects other than the object corresponding to the virtual object selected by the user. By this means, the system control unit 23 determines whether or not the degree-of-match is high.

Consequently, it is possible to search image data of an image including at least the object corresponding to the virtual object selected by the user. Further, it is possible to recommend information related to an image capturing spot at which an image of at least the object corresponding to the virtual object selected by the user can be captured. This is suitable for the user who thinks that, although objects other than the object corresponding to the virtual object selected by the user may be arranged at any positions, the user wants to capture an image in which the object corresponding to at least the virtual object selected by the user is arranged at a desired position.

Further, on the object arrangement screen 300 or the object arrangement check screen 400, the user may be allowed to select one or more virtual objects from virtual objects arranged in the virtual three-dimensional space, and the information providing server 2 may exclude virtual objects other than the virtual object selected by the user from a projection object on the projection plane and generate user two-dimensional arrangement information. Furthermore, the system control unit 23 may perform degree-of-match determination processing in step S24 based on the user two-dimensional arrangement information generated in this way. By this means, the degree-of-match is determined assuming a state where virtual objects other than a virtual object selected by the user from the virtual objects arranged in the virtual three-dimensional space by the user are not arranged. Consequently, even when the user does not cancel the specified arrangement of the virtual object, it is possible to search data of an image which does not include objects other than the object corresponding to the virtual object selected by the user as much as possible. Further, it is possible to recommend information related to an image capturing spot at which an image is captured such that objects other than an object corresponding to the virtual object selected by the user are not reflected as much as possible. By this means, when, for example, the user continues an operation of arranging virtual objects and an operation of setting a point-of-view position and a line-of-sight direction after searching image data, it is possible to skip labor of, for example, removing virtual objects from the virtual three-dimensional space and rearranging removed virtual objects. Also in this case, the terminal device 1-*k* transmits to the information providing server 2 a request message including selected object information which indicates an object selected by the user.

Further, although, when the terminal device 1-*k* specifies an initial value of the reference position, a coordinate of the reference position set in advance is acquired in step S2, the initial value of the reference position may be automatically set according to, for example, an arrangement situation of virtual objects in the three-dimensional space.

For example, the system control unit 37 of the terminal device 1-*k* may specify as a reference position a position of a virtual object of a maximum size among virtual objects arranged in the virtual three-dimensional space. More specifically, the system control unit 37 calculates a volume of a solid figure of each virtual object. Further, the system control unit 37 specifies as a coordinate of a reference position a coordinate of a center position of a solid figure of the virtual object of the maximum volume. Furthermore, the system control unit 37 changes at least one of the point-of-view position and the line-of-sight direction indicated by the line-of-sight mark 323 displayed on the object arrangement screen 300 such that a line of sight passes a reference position, and sets initial values of the point-of-view position and the line-of-sight direction. By this means, the point-of-view position and the line-of-sight direction can be set based on a user's operation such that the virtual object of the maximum size is projected on the projection plane.

Further, when a plurality of virtual objects is arranged in the virtual three-dimensional space, the system control unit 37 may specify as the reference position the center positions of virtual objects arranged in the virtual three-dimensional space. That is, the position which serves as the center in the positional relationship between virtual objects based on the arrangements of a plurality of virtual objects may be set as a reference position. More specifically, the system control unit 37 specifies the coordinate of the center position of a solid figure of each virtual object as a coordinate of a position of each virtual object. Next, the system control unit 37 calculates a coordinate of a position which serves as a center of positions of a plurality of virtual objects. For example, the system control unit 37 may calculate the coordinate of the center position by adding X components, Y components and Z components of the coordinates of the positions of a plurality of virtual objects and dividing a total value of each component by the number of virtual objects. Further, the system control unit 37 specifies the calculated coordinate as a coordinate of the reference position. Also in this case, the system control unit 37 sets initial values of the point-of-view position and the line-of-sight direction such that the line of sight passes the reference position. Consequently, it is possible to specify as the reference position a position at which a balance is kept between positions of a plurality of virtual objects. In addition, when only one virtual object is arranged in the virtual three-dimensional space, the center position of the solid figure of the arranged virtual object becomes the reference position.

Further, the system control unit 37 may specify a point-of-view position and a line-of-sight direction at which all virtual objects arranged in the virtual three-dimensional space are projected on the projection plane and which minimize the degree of overlap of the projected virtual objects, and specify an initial value of a reference position on a line of sight indicated by the specified point-of-view position and the line-of-sight direction. More specifically, the system control unit 37 generates a plurality of pieces of user two-dimensional arrangement information corresponding to a plurality of pairs of point-of-view positions and line-of-sight directions whose at least ones of the point-of-view positions and line-of-sight directions are different, based on the three-dimensional arrangement position information acquired in step S1. Meanwhile, the system control unit 37 may fix the point-of-view position at the point-of-view position indicated by the line-of-sight mark 323, change the line-of-sight direction at an angle interval (for example, 10 degrees) set in advance and generate a pair of the point-of-view position and the line-of-sight direction. Further, the system control unit 37 may fix the point-of-view direction in the line-of-sight direction indicated by the line-of-sight mark 323, change the point-of-view position at the distance interval (corresponding to, for example, one block) set in advance and generate a pair of the point-of-view position and the line-of-sight direction. Furthermore, the system control unit 37 may change both of the point-of-view position and the line-of-sight direction. A method of generating user two-dimensional arrangement information is the same as that in step S23. Meanwhile, the system control unit 37 excludes user two-dimensional arrangement information based on which it is determined that there is even one virtual object which is not projected on the projection plane among virtual objects arranged in the virtual three-dimensional space, from specified candidates of the reference position. Meanwhile, the system control unit 37 selects user two-dimensional arrangement information which minimizes the degree of overlap of virtual objects in the projection plane among user two-dimensional arrangement information based on which it is determined that all virtual objects are projected. A method of selecting user two-dimensional arrangement information which minimizes the degree of overlap of virtual objects is the same as the above-described method. Next, the system control unit 37 sets the point-of-view position and the line-of-sight direction used to generate the selected user two-dimensional arrangement information, as initial values of the point-of-view position and the line-of-sight direction. Further, the system control unit 23 sets the reference position on the line of sight indicated by the point-of-view position and the line-of-sight direction set as the initial values. For example, the system control unit 37 sets a point which is at a distance set in advance from the point-of-view position, as the reference point, and sets the position of this reference point as the reference position. By this means, the user can start an operation of setting the point-of-view position and the line-of-sight direction from the point-of-view position and the line-of-sight direction which minimize the degree of overlap of virtual objects in the projection plane in case that the virtual objects are projected on the projection plane. Further, in a state where the object three-dimensional images 411 of all virtual objects arranged in the virtual three-dimensional space are displayed in the pseudo frame 410, the user can start the operation.

In addition, the information providing server 2 may specify initial values of the reference position, a point-of-view position and a line-of-sight direction. In this case, the terminal device 1-*k* transmits user three-dimensional arrangement information to the information providing server 2. Further, the terminal device 1-*k* transmits line-of-sight information to the information providing server 2 where necessary. The information providing server 2 generates a plurality of pieces of user two-dimensional arrangement information corresponding to a plurality of pairs of point-of-view positions and line-of-sight directions whose at least one of point-of-view positions and line-of-sight directions are different, based on the received user three-dimensional arrangement information. Next, the information providing server 2 specifies initial values of the reference position, the point-of-view position and the line-of-sight direction based on the generated user two-dimensional arrangement information. Further, the information providing server 2 transmits initial value information which indicates initial values of the specified reference position, point-of-view position and line-of-sight direction, to the terminal device 1-*k*. The terminal device 1-*k* displays the object three-dimensional images 411 based on the received initial value information in step S3.

Further, a configuration may be employed where, upon determination of the degree-of-match in step S24, position information (for example, position information detected by a GPS receiver of the terminal device 1-*k*) which indicates a current position of the user who is authenticated or position information which indicates a position specified by the user is acquired from the terminal device 1-*k*. In this case, the system control unit 23 searches image data captured within a predetermined range (for example, a range in a predetermined distance of the radius around the current position of the user or the position specified by the user) from the position (for example, the current position of the user or the position specified by the user) indicated by the position information acquired from the terminal device 1-*k* among image data registered in the image information DB 222. By this means, at a place at which the user stays (for example, a trip destination) or near a place specified by the user, it is possible to efficiently search image data of an image including an object matching a user's preference and efficiently recommend information related to an image capturing spot at which an image of an object matching the user's preference can be captured at the arranged position matching the user's preference.

Further, a configuration may be employed where, when there is a plurality of items of image data specified based on a determination result of the degree-of-match (that is, a comparison result) upon processing in step S25, a list of image capturing spot information registered in association with each image data is transmitted to the terminal device 1-*k* and is displayed upon recommendation processing in step S27. According to this configuration, even when there are multiple spots of recommendation objects, the user can easily learn image capturing spots near these spots.

Further, a configuration may be employed where, when there is a plurality of items of image data specified based on a determination result of the degree-of-match upon processing in step S25, map information which indicates a position of each image capturing spot registered in association with each image data is transmitted to the terminal device 1-*k* and is displayed upon recommendation processing in step S27. According to this configuration, the user can easily learn positions of image capturing spots near these spots on the map even when there are multiple spots of recommendation objects.

Further, when image data cannot be specified based on the determination result of the degree-of-match upon processing in step S25, the determination condition may be gradually relaxed until at least one image data can be specified based on the determination result of the degree-of-match. More specifically, the number of objects to be compared may be gradually decreased. Further, when the user compares arrangement positions of virtual objects on the projection plane and arrangement positions at which objects are represented in image data, the range for determining the degree-of-match may be gradually widen. When, for example, an arrangement position of a virtual object on the projection plane is indicated by the area numbers "12", "13", "22" and "23", areas to compare may be expanded to determine that the degree-of-match of image data represented in areas of area numbers "1" to "5", "11" to "15", "21" to "25" or "31" to "35" is high. By so doing, it is possible to reduce a likelihood of an event that it is not possible to respond to a user's request.

Further, although only arrangement positions of object information are compared upon processing in step S24 (degree-of-match determination processing), arrangement positions and colors of objects may be compared by allowing the user to specify colors of virtual objects arranged in the virtual three-dimensional space, on the object arrangement screen 300 or the object arrangement check screen 400. More specifically, the system control unit 23 further receives color information which indicates a color of a virtual object, and further determines the degree-of-match between the color of the virtual object indicated by the received color information and a color of an object included in an image indicated by the registered image data. By so doing, by, for example, specifying "mountain" as object information and specifying "red" and "yellow" as colors of "mountain", the user can efficiently search image data of an image including a mountain at which leaves of trees are turning red, and acquire information related to an image capturing spot at which the mountain at which the leaves of the trees are turning red can be captured. In addition, by transmitting image capturing spot information and an image capturing date and time, it is possible to present to the user a period which is suitable to capture images.

Further, although all items of image data registered in the image information DB 222 are comparison objects upon processing in step S24 (degree-of-match determination processing), by having the user specify conditions related to image capturing spot information, only image data corresponding to image capturing spot information which satisfies the conditions may be comparison objects. More specifically, the system control unit 23 further receives condition information which indicates the conditions related to the image capturing spot information, and performs processing (degree-of-match determination processing) in step S24 on image data corresponding to image capturing spot information which satisfies the conditions indicated by the received condition information. By so doing, by, for example, specifying that "an image capturing spot is the Kanto region" as a condition related to image capturing spot information, the user can efficiently search image data which can be captured in the Kanto region and acquire information related to spots in the Kanto region. Further, when the user has a plan to make a trip to Korea, by specifying that "an image capturing spot is in Korea" as a condition related to image capturing spot information, the user can efficiently search image data which can be captured in Korea and acquire information related to spots in Korea. Furthermore, by specifying that "an image capturing spot is a room of an accommodation facility" as a condition related to image capturing spot information, arranging the objects 321 on the object arrangement screen 300 according to a scenery which the user wants to see, and checking arrangements of the object three-dimensional images 411 of the object arrangement check screen 400, it is possible to efficiently search image data including the scenery of interest and acquire information related to a spot related to the room of the accommodation facility from which the user can see the scenery of interest. In addition, an accommodation facility guiding system may be additionally constructed to provide information related to a spot and guide information of the accommodation facility. Further, reservation service of an accommodation facility may be provided.

Furthermore, a configuration may be employed where, upon processing (degree-of-match determination processing) in step S24, an extraction object range of image data is determined based on a specific object of an image capturing object specified by the user. When, for example, the user specifies "mountain" as an object and specifies "Mt. Fuji" to specify this mountain (from position information), upon processing (degree-of-match determination processing) in step S24, a predetermined range based on position information (for example, a longitude and a latitude) of specified Mt. Fuji is determined as an extraction object range of image data, and image data captured within this range is searched. By this means, it is possible to search image data of an image including an object (for example, Mt. Fuji) matching a user's preference around the object (for example, Mt. Fuji) of a specific image capturing object specified by the user, and efficiently recommend information related to an image capturing spot at which an image of the object (for example, Mt. Fuji) matching the user's preference can be captured at an arranged position matching the user's preference. In addition, the predetermined range based on the position information of Mt. Fuji corresponds to a range in a predetermined distance (for example, 10 km) of the radius around the longitude and the latitude of Mt. Fuji. Further, this extraction target range may be a concentric circle of a donut shape (that is a donut area on an outer side of a circle around the position information) based on the position information of Mt. Fuji. Furthermore, a configuration may be employed where this predetermined distance of the radius is increased stepwise based on the position information of Mt. Fuji to expand the extraction target range stepwise. Also in this case, the concentric circle of the donut shape based on the position information of Mt. Fuji may be expanded stepwise, and, in conjunction with this expansion, the circle (that is, a circle on an inner side of the donut area) around the position information may be expanded stepwise. Alternatively, a configuration may be employed where the predetermined range is determined based on a rate (for example, a ratio of an area) of a size of a virtual object projected on a projection plane with respect to the projection plane of a projected image. When, for example, the rate of the size of the virtual object (mountain) with respect to the projection plane of the projected image is 90%, the range in 5 km of the radius around the longitude and the latitude of the mountain is determined as an extraction target range. Further, when the rate comes closer to 0% from 80% (in other words, when the size of the projected image of the virtual object becomes lower), the radius gradually becomes bigger and, as a result, the extraction object range is determined to gradually widen. According to this configuration, only by determining the size of a projected image of a virtual object, the user can easily determine an extraction target range of image data. In addition, "Mt. Fuji" is specified as a condition related to image capturing spot information to specify the mountain. In this case, the system control unit 23 receives condition information including specified "Mt. Fuji" as a condition and user arrangement information from the terminal device 1-k.

According to the present embodiment, a configuration is employed where, (i) when image data posted in an image posting site is registered in the image information DB 222, the system control unit 23 of the information providing server 2 specifies an object included as an object image in an image indicated by the received image data and arrangement position information of the object using an object recognition algorithm. Instead, a configuration may be employed where a program including the object recognition algorithm is installed in a terminal device of a poster to cause the terminal device to specify an object included in an image indicated by image data and arrangement position information of the object and cause the information providing server 2 to receive the object and the arrangement position information. Further, the information providing processing program including the object recognition algorithm is installed in a terminal device, and image data, an object included in an image indicated by the image data and arrangement position information of each object in the image are stored in an internal memory unit mounted on the terminal device or an external memory unit connected to the terminal device. Furthermore, a configuration may be employed where the terminal device generates user two-dimensional arrangement information according to a user's operation, compares arrangement position information of an object included in an image indicated by image data stored in the memory unit and arrangement position information included in the generated user two-dimensional arrangement information, and search and display image data based on a determination result of the comparison. By this means, it is possible to efficiently search image data of an image including an object matching a user's preference from multiple items of image data collected by the user and present the image data to the user. In addition, for example, the information providing processing program to be installed in the terminal device may be acquired (downloaded) from, for example, a predetermined server through the network NW, or may be recorded in a recording medium such as a CD (Compact Disc) or a DVD (Digital Versatile Disc) and read.

Further, although an arrangement position or a size of an object in the image P or the projection plane Q are managed based on area numbers in the present embodiment, an arrangement position or a size of an object may be managed based on an outline coordinate of an object image in the image P or an outline coordinate of a projected image on the projection plane Q. In this case, the degree-of-match is determined by comparing outline coordinates of objects. When, for example, the picture P and the projection plane Q are overlaid and overlapping portions of objects are a predetermined rate or more, it is determined that the degree-of-match is high. In addition, a method of managing an arrangement position or a size of an object can adopt an arbitrary method.

Further, although image data of a search object is an image capturing object at an image capturing spot in the embodiment, image data may be irrelevant to an image capturing spot.

REFERENCE SIGNS LIST

1-$k$ Terminal device
2 Information providing server
21 Communication unit
22 Memory unit
23 System control unit
NW Network
S Information providing system

The invention claimed is:

1. An information providing device that a terminal device can access through a network, the information providing device comprising:
   at least one memory configured to store computer program code, respective image data of at least one image, and arrangement information corresponding to respective image data of the at least one image;
   a receiver configured to receive three-dimensional arrangement information which indicates an arrangement of an object in three-dimensional space, and line-of-sight information for specifying a point-of-view position and a line-of-sight direction in the three-dimensional space, from the terminal device; and
   at least one processor configured to access said memory, read said computer program code, and execute according to said computer program code,
   said computer program code comprising:
      generating code configured to cause at least one of said at least one processor to generate two-dimensional arrangement information which indicates, in a two-dimensional plane, an arrangement of the object projected on the two dimensional plane based on the received three-dimensional arrangement information and line-of sight information, the line-of-sight information being based on an overlap of objects in the two-dimensional plane; and
      searching code configured to cause at least one of said at least one processor to
         compare the arrangement information stored in the at least one memory and the generated two-dimensional arrangement information, and
         search the respective image data based on a result of the comparison,
   wherein arrangement information indicates, in an image, relative locations of areas occupied by an image of the object included in the image indicated by the image data,
   wherein the searching code is further configured to cause at least one of said at least one processor to search the respective image data based on a similarity between the relative locations of areas occupied by the image of the object in the arrangement information stored in the at least one memory and the generated two-dimensional arrangement information,
   wherein the receiver is further configured to receive the line-of-sight information for specifying a plurality of pairs of point-of-view positions and line-of-sight directions,
   wherein the generating code is further configured to cause at least one of said at least one processor to generate a plurality of items of the two-dimensional arrangement information based on the plurality of pairs specified based on the received line-of sight information, and
   wherein the searching code is further configured to cause at least one of said at least one processor to compare the arrangement information stored in the at least one memory and the plurality of items of the generated two-dimensional arrangement information.

2. The information providing device according to claim 1, wherein
   said computer program code further comprises selecting code configured to cause at least one of said at least one processor to select two-dimensional arrangement information which indicates an arrangement which minimizes a degree of the overlap of objects in the two-dimensional plane, from the plurality of the generated two-dimensional arrangement information, and
   the searching code is further configured to cause at least one of said at least one processor to compare the arrangement information stored in the at least one memory and the selected two-dimensional arrangement information.

3. The information providing device according to claim 2, wherein
   the at least one memory is further configured to store position information of the corresponding to respective image data of the at least one image;
   the receiver is further configured to receive condition information which indicates a condition related to position information; and
   the searching code is further configured to cause at least one of said at least one processor to search for image data of the respective image data associated with the stored position information which satisfies the condition indicated by the received condition information.

4. The information providing device according to claim 3, further comprising a transmitter,
   wherein the at least one memory is further configured to store position information corresponding to respective image data of the at least one image, and
   wherein said computer program code further comprises transmitting code configured to cause at least one of said at least one processor to control the transmitter to transmit the position information of image data of the respective image data searched according to the searching code, to the terminal device.

5. The information providing device according to claim 1, wherein
   the receiver is further configured to receive selection information which indicates an object selected by a user from objects arranged in the three-dimensional space; and
   the searching code is further configured to cause at least one of said at least one processor to compare an arrangement of the object indicated by the received selection information among arrangements indicated by the generated two-dimensional arrangement information, and an arrangement of an object corresponding to the object indicated by the received selection information among arrangements indicated by the arrangement information stored in the at least one memory.

6. The information providing device according to claim 1, wherein
the receiver is further configured to receive selection information which indicates an object selected by a user from objects arranged in the three-dimensional space; and
the generating code is further configured to cause at least one of said at least one processor to generate the two-dimensional arrangement information by excluding objects which are other than object information indicated by the received selection information among objects arranged in the three-dimensional space, from projection objects on the two-dimensional plane.

7. The information providing device according to claim 1, wherein
said computer program code further comprises display control code configured to cause at least one of said at least one processor to display object candidates which represent objects arranged in the three-dimensional space, on a display screen of the terminal device such that a user can select an object candidate, and
the receiver is further configured to receive three-dimensional arrangement information which indicates an arrangement of the object candidate which is selected by the user and which is arranged in virtual three-dimensional space, as three-dimensional arrangement information which indicates the arrangement of the object in the three-dimensional space.

8. The information providing device according to claim 1, wherein
the receiver is further configured to receive color information which indicates a color of the object in the three-dimensional space; and
the searching code is further configured to cause at least one of said at least one processor to compare the color of the object indicated by the received color information and a color of an object included in the image indicated by the image data.

9. The information providing device according to claim 1, wherein
the at least one memory is further configured to store position information corresponding to respective image data of the at least one image;
the receiver is further configured to receive condition information which indicates a condition related to position information; and
the searching code is further configured to cause at least one of said at least one processor to search for image data of the respective image data associated with the stored position information which satisfies the condition indicated by the received condition information.

10. The information providing device according to claim 1, further comprising a transmitter,
wherein said computer program code further comprises transmitting code configured to cause at least one of said at least one processor to control the transmitter to transmit image data of the respective image data searched according to the searching code, to the terminal device.

11. The information providing device according to claim 1, further comprising a transmitter,
wherein the at least one memory is further configured to store position information corresponding to respective image data of the at least one image, and
wherein said computer program code further comprises transmitting code configured to cause at least one of said at least one processor to control the transmitter to transmit the position information of image data of the respective image data searched according to the searching code, to the terminal device.

12. An information providing method in an information providing device that a terminal device can access through a network, the information providing method comprising:
receiving three-dimensional arrangement information which indicates an arrangement of an object in three-dimensional space, and line-of-sight information for specifying a point-of-view position and a line-of-sight direction in the three-dimensional space, from the terminal device;
generating two-dimensional arrangement information which indicates, in a two-dimensional plane, an arrangement of the object projected on the two dimensional plane based on the received three-dimensional arrangement information and line-of sight information, the line-of-sight information being based on an overlap of objects in the two-dimensional plane; and
comparing the generated two-dimensional arrangement information with arrangement information stored in a memory corresponding to respective image data of at least one image, the memory storing the respective image data and the arrangement information corresponding to the respective image data which indicates, in the at least one image, relative locations of areas occupied by an image of the object included in the image indicated by the image data, and
searching for the image data based on a result of the comparison,
wherein the searching comprises searching the respective image data based on a similarity between the relative locations of areas occupied by the image of the object in the arrangement information stored in the at least one memory and the generated two-dimensional arrangement information,
wherein the receiving three-dimensional arrangement information comprises receiving the line-of-sight information for specifying a plurality of pairs of point-of-view positions and line-of-sight directions,
wherein the generating two-dimensional arrangement information comprises generating a plurality of items of the two-dimensional arrangement information based on the plurality of pairs specified based on the received line-of sight information, and
wherein the searching further comprises comparing the arrangement information stored in the at least one memory and the plurality of items of the generated two-dimensional arrangement information.

13. An information providing system comprising:
a terminal device; and
an information providing device that the terminal device can access through a network,
wherein the terminal device comprises:
a transmitter;
at least one first memory configured to store first computer program code;
at least one first processor configured to access said first memory, and execute according to said first computer program code,
wherein said first computer program code comprises transmitting code configured to cause at least one of said at least one first processor to control the transmitter to transmit three-dimensional arrangement information which indicates an arrangement of an object in three-dimensional space and line-of-sight information for specifying a point-of-view position and a line-of-sight direction in the three-dimensional space, to the information providing device;

wherein the information providing device comprises:

at least one second memory configured to store second computer program code, image data of at least one image, and the arrangement information corresponding to respective image data of the at least one image;

a receiver configured to receiver the three-dimensional arrangement information and the line-of-sight information transmitted from the terminal device; and at least one second processor configured to access said second memory, and execute according to said second computer program code, wherein said second computer program code comprises:

generating code configured to cause at least one of said at least one second processor to generate two-dimensional arrangement information which indicates, in a two-dimensional plane, relative locations of areas occupied by an image of the object projected on the two dimensional plane based on the received three-dimensional arrangement information and line-of sight information, the line-of-sight information being based on an overlap of objects in the two-dimensional plane; and searching code configured to cause at least one of said at least one second processor to compare the arrangement information stored in the at least one first memory and the generated two-dimensional arrangement information, and search the respective image data based on a result of the comparison, wherein arrangement information indicates, in an image, an arrangement of the object included in the image indicated by the image data, wherein the searching code is further configured to cause at least one of said at least one processor to search the respective image data based on a similarity between the relative locations of areas occupied by the image of the object in the arrangement information stored in the at least one memory and the generated two-dimensional arrangement information, wherein at least one of the first computer program code and the second computer program code further comprises:

specifying code configured to cause at least one of said at least one first processor or at least one second processor to specify a reference position to which a line of sight is directed in virtual three-dimensional space;

the first computer program code further comprises:

acquiring code configured to cause at least one of said at least one first processor to acquire three-dimensional arrangement information which indicates, in virtual three-dimensional space, an arrangement of a virtual object arranged in the virtual three-dimensional space by a user's operation; and setting code configured to cause at least one of said at least one first processor to set the line-of-sight information by moving the point-of view position while a direction to the reference position specified based on the point-of-view position is regarded as the line-of-sight direction, according to the user's operation, and the transmitting code is further configured to cause at least one of said at least one first processor to control the transmitter to transmit the acquired three-dimensional arrangement information and the set line-of-sight information.

14. The information providing system according to claim 13, wherein the specifying code is further configured to cause at least one of said at least one first processor or at least one second processor to specify, as the reference position, a position of a virtual object of a maximum size among virtual objects arranged in the virtual three-dimensional space.

15. The information providing system according to claim 13, wherein, when a plurality of virtual objects is arranged in the virtual three-dimensional space, the specifying code is further configured to cause at least one of said at least one first processor or at least one second processor to specify, as the reference position, a position which is a gravity center of positions of the plurality of arranged virtual objects.

16. The information providing system according to claim 13, wherein at least one of first computer program code and the second computer program code further comprises:

second generating code configured to cause at least one of said at least one first processor or at least one second processor to generate a plurality of pieces of two-dimensional arrangement information which indicates, in the two-dimensional plane, the arrangement of the virtual object projected on the two-dimensional plane based on the acquired three-dimensional arrangement information, and for which at least one of point-of-view positions and line-of-sight directions is different;

the specifying code is further configured to cause at least one of said at least one first processor or at least one second processor to specify the reference position on a line of a sight indicated by a point-of-view position and a line-of-sight direction used to generate two-dimensional arrangement information which minimizes a degree of the overlap of virtual objects arranged in the two-dimensional plane among the plurality of pieces of the generated two-dimensional arrangement information; and the setting code is further configured to cause at least one of said at least one first processor to set, as an initial state, the point-of-view position and the line-of sight direction used to generate the two-dimensional arrangement information which minimizes the degree of the overlap of the virtual objects arranged on the two-dimensional plane, and changes the point-of-view position and the line-of-sight direction from the initial state according to a user's second operation.

\* \* \* \* \*